United States Patent
Ishii et al.

(10) Patent No.: US 7,363,057 B2
(45) Date of Patent: Apr. 22, 2008

(54) MOBILE COMMUNICATION SYSTEM, MOBILE STATION, BASE STATION, COMMUNICATION PATH QUALITY ESTIMATION METHOD USED FOR THE SAME

(75) Inventors: Naoto Ishii, Tokyo (JP); Shousei Yoshida, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/510,453

(22) PCT Filed: Apr. 3, 2003

(86) PCT No.: PCT/JP03/04291
§ 371 (c)(1),
(2), (4) Date: Oct. 4, 2004

(87) PCT Pub. No.: WO03/084099
PCT Pub. Date: Oct. 9, 2003

(65) Prior Publication Data
US 2005/0181832 A1    Aug. 18, 2005

(30) Foreign Application Priority Data

Apr. 3, 2002   (JP) ............................. 2002-100702
Apr. 24, 2002  (JP) ............................. 2002-121561

(51) Int. Cl.
*H04M 1/00* (2006.01)
*H04B 1/38* (2006.01)
*H04B 15/00* (2006.01)
*H04B 17/00* (2006.01)
*H04H 1/00* (2006.01)

(52) U.S. Cl. ............... 455/562.1; 455/63.4; 455/67.11; 455/550.1; 455/561; 455/575.7; 370/339

(58) Field of Classification Search ................ 455/437, 455/442, 450, 452.1–452.2, 562.1, 63.3–63.4, 455/25, 67.11, 82–83, 107, 513, 500–501, 455/515–517, 520–522, 524–526, 550.1, 455/556.1, 556.2, 557–558, 560–561, 575.7, 29, 41.2, 62, 67.13, 135, 161.3, 277.2, 422.1, 423–425, 509; 370/310.2, 328–329, 332–334, 337–339, 252–253, 248–249, 341, 347, 437, 458, 465; 343/700 R, 703, 777, 876, 907; 342/359–361, 380–385, 422–424, 434, 437, 439, 442, 443–445
See application file for complete search history.

(56) References Cited

U.S. PATENT DOCUMENTS 6,430,166 B1 * 8/2002 Bejjani et al. .............. 370/320
(Continued)

FOREIGN PATENT DOCUMENTS

EP    1 158 709 A1   11/2001
(Continued)

OTHER PUBLICATIONS

T J Moulsley; "Throughput of High Speed Downlink Packet Access for UMTS"; 3G Mobile Communications Technologies; Mar. 26-28, 2001; Conference Publication No. 477; pp. 363-367.
(Continued)

*Primary Examiner*—Meless Zewdu
(74) *Attorney, Agent, or Firm*—Dickstein Shapiro LLP

(57) ABSTRACT

A mobile communication system capable of improving the system throughput. A base station (1) divides one cell into three sectors. A common pilot channel is transmitted to a plurality of mobile stations in the sectors by beams (101-103) whose directivity is controlled by an adaptive antenna for each of the sectors. On the other hand, when a mobile station (2) communicates data with the base station (1), the base station transmits a data channel and an individual control channel to the mobile station (2) by using a beam (201) whose directivity is controlled individually. The mobile station (2) switches between the common pilot channel and the individual control channel from the base station (1) for estimating the communication path quality.

60 Claims, 22 Drawing Sheets

U.S. PATENT DOCUMENTS

| | | | |
|---|---|---|---|
| 6,766,146 B1* | 7/2004 | Park et al. | 455/69 |
| 6,879,831 B2* | 4/2005 | Hamabe | 455/442 |
| 6,901,062 B2* | 5/2005 | Scherzer et al. | 370/335 |
| 6,980,782 B1* | 12/2005 | Braun et al. | 455/277.2 |
| 7,043,272 B2* | 5/2006 | Park et al. | 455/562.1 |
| 7,058,363 B2* | 6/2006 | Hottinen et al. | 455/69 |
| 7,116,650 B2* | 10/2006 | Takeuchi et al. | 370/329 |
| 7,174,178 B2* | 2/2007 | Bergel | 455/502 |
| 2002/0044591 A1* | 4/2002 | Lee et al. | 375/130 |
| 2002/0118727 A1* | 8/2002 | Kim et al. | 375/146 |
| 2002/0119757 A1* | 8/2002 | Hamabe | 455/69 |
| 2002/0131381 A1* | 9/2002 | Kim et al. | 370/335 |

FOREIGN PATENT DOCUMENTS

| | | |
|---|---|---|
| JP | 9-9344 | 1/1997 |
| JP | 2001-197037 | 11/2001 |
| JP | 2002-111570 | 4/2002 |

OTHER PUBLICATIONS le;.5qJapanese Office Action dated Jun. 6, 2006 (and English translation of relevant portion).

Xie Jurrsong, et al., "Mobile High Speed Data Transmission and Recent Advance of HSDPA," Computer Applications, vol. 22, No. 2, Feb. 2002.

* cited by examiner

MOBILE COMMUNICATION SYSTEM, MOBILE STATION, BASE STATION, COMMUNICATION PATH QUALITY ESTIMATION METHOD USED FOR THE SAME

TECHNICAL FIELD

The present invention relates to a mobile communication system, a mobile station, a base station, and a communication path quality estimation method for use therein and, in particular, relates to a method of estimating a communication path quality in a mobile communication system.

BACKGROUND ART

Following the increase in demand for data communications, high-speed large-capacity downlink packet systems have been actively studied. For example, in the next generation mobile communication system (IMT-2000), the high speed downlink packet transmission (HSDPA: High Speed Downlink Packet Access) using the W-CDMA (Wideband-Code Division Multiple Access) has been discussed in the 3GPP (3 rd Generation Partnership Project).

In the HSDPA, a high speed downlink shared channel (HS-PDSCH: High Speed-Physical Downlink Shared Channel) is used for downlink transmission from a base station to a mobile station. The HS-PDSCH is for transmitting packet data, and a plurality of mobile stations can use one HS-PDSCH in a shared manner by temporally sharing (time-sharing) it.

In the HSDPA system, uplink control channels (HS-DPCCH: High Speed-Dedicated Physical Control Channel) are set between a base station and a plurality of mobile stations for controlling data transmission from the base station to the mobile stations. The HS-DPCCH is used by the mobile station for transmitting ACK/NACK information about an HARQ (Hybrid Automatic Repeat reQuest) and communication path quality information to the base station.

The communication path quality represents a signal power to interference power ratio (SIR: Signal to Interference Ratio) of a common pilot signal (CPICH: Common Pilot Channel). Here, since all channels are temporally multiplexed and transmitted, the mobile stations each can use the common pilot channel transmitting known data symbols, so as to measure the reception quality.

The HSDPA system uses the AMCS (Adaptive Modulation and Coding Scheme) that adaptively changes modulation and coding rate according to a notified communication path quality. When the AMCS is applied, it is possible to carry out transmission that depends on the communication path quality. Specifically, when the communication path quality is excellent, the throughput can be improved by applying a modulation system with a large multilevel value and an error correcting code with a large coding rate while, when it is poor, the packet error rate can be suppressed by reducing both the multilevel value and the coding rate, so that it is possible to increase the system capacity.

In the packet transmission like the HSDPA, after receiving data transmission requests from a plurality of mobile stations, a base station determines transmission order among the mobile stations (scheduling) and transmits data. In this scheduling, use is made of communication path qualities notified from the mobile stations. The scheduling that performs packet transmission preferentially to such a mobile station with a high communication path quality is called a Maximum C/I scheduler.

When the Maximum C/I scheduler is used, transmission is performed in an instant when the communication path quality is high. Therefore, when the AMCS is applied, the probability of selecting a higher MCS level increases to thereby raise the average value of transmission rates, so that it is possible to increase the system throughput.

Further, apart from the communication system, an adaptive antenna enables separation of signals by the use of its directivity and, when applied to downlink communication, enables reduction in interference. Therefore, by applying the adaptive antenna to a downlink common channel that transmits packet data, the power can be transmitted convergently only in the direction of a mobile station so that it is possible to reduce interference to other users.

Conventionally, in case where the adaptive antenna is not applied to downlink transmission, the communication path quality observed by a mobile station does not rely on the state of communication. However, when the adaptive antenna is applied thereto, since a data channel is transmitted only in the direction controlled by the directivity, although the data channel is subjected to multipath interference while packet transmission is carried out, the data channel is not subjected to multipath interference while packet transmission is not carried out. This is because data channels of other mobile stations are separated by the directivity so that interference power is reduced. That is, the communication path quality observed by the mobile station relies on the state of communication.

In the foregoing conventional mobile communication system, the common pilot channel is used as a channel for estimating the communication path quality that is notified to the base station from the mobile station. However, there arises a problem that since the common pilot channel is not transmitted to a particular mobile station with a directivity given thereto, the communication path differs from a channel that actually transmits packets so that there occurs a difference between the estimated communication path quality and a communication path quality upon reception.

Further, a dedicated control channel controlled in directivity and given to each of users that carry out packet communication may be used for communication path quality estimation. However, if the control channels are allocated to all users in communication and on standby to carry out the communication path quality measurement, signal power to be allocated to the users on standby, which is not primarily necessary, increases and this causes interference to the users receiving packets. Thus, there is no merit of applying the adaptive antenna. Alternatively, if, as conventional, dedicated control channels controlled in directivity and given to only those users receiving packets are used for the communication path quality estimation, there is a problem that the communication path quality estimation cannot be carried out while waiting for packets.

Further, in the foregoing conventional mobile communication system, although MCS selection is carried out based on the communication path quality, when the adaptive antenna is used, the data channels of other mobile stations are separated in a standby state by the directivity of the adaptive antenna, and therefore, it is not possible to know degradation of the communication path quality due to multipath interference to the data channel in a communication state.

Consequently, in the conventional mobile communication system, there arises a problem that the communication path quality measured in the standby state becomes higher than the communication path quality in the communication state, and therefore, if MCS selection is carried out based on the communication path quality measured in the standby state, the probability of occurrence of packet reception errors becomes high so that the transmission efficiency is reduced.

Further, in the conventional mobile communication system, it is important to use the communication path qualities measured in the same condition over all mobile stations when carrying out the scheduling, but, when the adaptive antenna is used, the communication path quality differs depending on the communication state of the mobile station.

Conventionally, the interference power used for estimation of the communication path quality is not measured instantaneously, but the average value is derived over a predetermined time. The communication path quality becomes poorer with respect to such a mobile station that performs packet transmission at a higher time rate in the predetermined time. That is, the communication path quality differs depending on the communication state (the rate of time in which packet transmission is carried out). Therefore, in the conventional method, there arises a problem that it is not possible to perform the comparison in the same condition.

Further, since interference to the data channel from other mobile stations is small in the standby state by means of the directivity, the communication path quality is measured better than in the communication state. When there exist a mobile station in the standby state and a mobile station in the communication state at the same time, the communication path quality notified by the mobile station in the standby state becomes high while the communication path quality notified by the mobile station in the communication state becomes low.

In this event, the Maximum C/I scheduler transmits data to the mobile station with the high communication path quality to bring it into the communication state and stops data transmission to the mobile station with the low communication path quality to bring it into the standby state. At the next time, the states are switched between these mobile stations. In the state where the states are further switched, the scheduler changes the states of the mobile stations by using notified communication path qualities, and therefore, there occurs a phenomenon that the standby state and the communication state are alternately switched between the mobile stations.

Here, since the MCS level of the mobile station brought into the communication state is determined on the basis of the communication path quality in the standby state, the probability of occurrence of packet errors increases, which further brings about an increase in the number of times of retransmission. Consequently, there arises a problem that the system throughput is reduced.

It is an object of the present invention to provide a mobile communication system, a mobile station, a base station, and a communication path quality estimation method for use therein that can improve the system throughput.

Further, it is another object of the present invention to provide a mobile communication system, a mobile station, a base station, and a communication path quality estimation method for use therein that can estimate a communication path quality in a constant condition that does not rely on a communication state immediately before.

DISCLOSURE OF THE INVENTION

A mobile communication system according to the present invention is a mobile communication system that uses an adaptive antenna in a base station and carries out downlink data transmission to a mobile station, wherein the mobile station comprises means for estimating a communication path quality by switching between a downlink common pilot channel transmitted with a first directivity and a downlink dedicated control channel transmitted with a second directivity, and means for notifying an estimation result thereof to the base station, and the base station comprises means for performing a communication control based on the communication path quality.

A mobile station according to the present invention is a mobile station to which downlink data transmission is carried out from a base station using an adaptive antenna, the mobile station comprising means for estimating a communication path quality by switching between a downlink common pilot channel transmitted with a first directivity and a downlink dedicated control channel transmitted with a second directivity.

A base station according to the present invention is a base station that carries out downlink data transmission to a mobile station by the use of an adaptive antenna, the base station comprising means for performing a communication control based on a result of estimation of a communication path quality from the mobile station, the estimation carried out by switching between a downlink common pilot channel transmitted with a first directivity and a downlink dedicated control channel transmitted with a second directivity.

A communication path quality estimation method according to the present invention is a communication path quality estimation method of a mobile communication system that uses an adaptive antenna in a base station and carries out downlink data transmission to a mobile station, wherein a step of estimating a communication path quality by switching between a downlink common pilot channel transmitted with a first directivity and a downlink dedicated control channel transmitted with a second directivity, and a step of notifying an estimation result thereof to the base station are provided in the mobile station.

That is, with respect to the mobile communication system that applies the adaptive antenna to the base station and carries out the high speed downlink packet transmission, the mobile communication system according to the present invention is characterized in that the mobile station estimates the communication path quality by switching between the common pilot channel and the dedicated control channel.

With this arrangement, in the mobile communication system of the present invention, even when the base station performs a directivity control for packet data transmission which is different from that of the common pilot channel, since the mobile station can estimate the communication path quality and notify it to the base station, such a control is enabled that matches the communication path quality of a channel that carries out packet data transmission.

A mobile communication system according to the present invention is a mobile communication system including a plurality of mobile stations, and a base station for transmitting data to the plurality of mobile stations, respectively, wherein each of the mobile stations receives the data, measures a first communication path quality in a data receiving state and a second communication path quality in a data waiting state, and notifies information corresponding to a measurement result thereof to the base station, and the base station controls transmission of the data depending on a notification thereof, the mobile communication system comprising means for performing a transmission control of the data by the use of both the first communication path quality and the second communication path quality.

A mobile station according to the present invention is a mobile station of a mobile communication system including a plurality of mobile stations, and a base station for transmitting data to the plurality of mobile stations, respectively, wherein each of the mobile stations receives the data, measures a first communication path quality in a data receiving state and a second communication path quality in a data waiting state, and notifies information corresponding to a measurement result thereof to the base station, and the base station controls transmission of the data depending on a notification thereof, the mobile station comprising means for notifying the base station of information corresponding to both the first communication path quality and the second communication path quality.

A base station according to the present invention is a base station of a mobile communication system including a plurality of mobile stations, and a base station for transmitting data to the plurality of mobile stations, respectively, wherein each of the mobile stations receives the data, measures a first communication path quality in a data receiving state and a second communication path quality in a data waiting state, and notifies information corresponding to a measurement result thereof to the base station, and the base station controls transmission of the data depending on a notification thereof, the base station comprising means for performing a transmission control of the data by the use of both the first communication path quality and the second communication path quality.

A communication path quality estimation method according to the present invention is a communication path quality estimation method of a mobile communication system including a plurality of mobile stations, and a base station for transmitting data to the plurality of mobile stations, respectively, wherein each of the mobile stations receives the data, measures a first communication path quality in a data receiving state and a second communication path quality in a data waiting state, and notifies information corresponding to a measurement result thereof to the base station, and the base station controls transmission of the data depending on a notification thereof, the communication path quality estimation method using both the first communication path quality and the second communication path quality in a transmission control of the data.

That is, with respect to the system that uses the adaptive antenna in the base station and carries out the high speed downlink packet transmission, the mobile communication system of the present invention is characterized in that the mobile station performs the communication control by cooperatively using the communication path quality in the standby state and the communication path quality in the receiving state. With this arrangement, in the present invention, the estimation accuracy of the communication path quality at the start of communication is improved so that the communication control with higher accuracy is made possible.

BEST MODE FOR CARRYING OUT THE INVENTION

Figure 1:
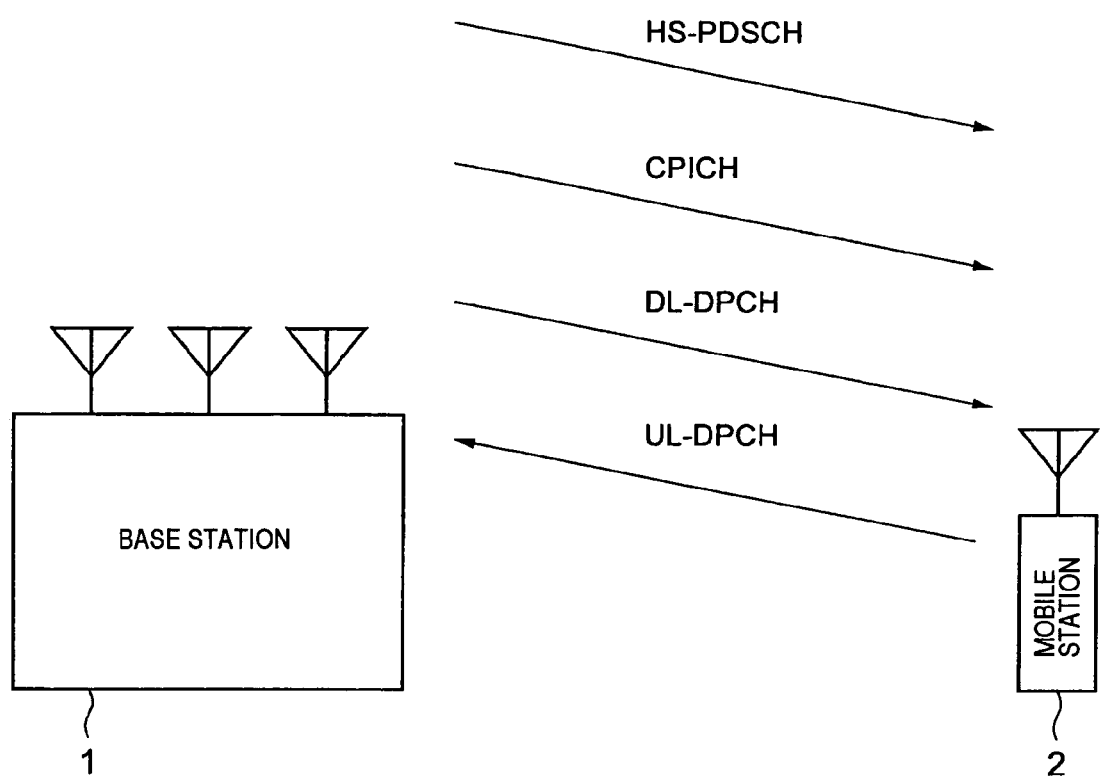
FIG. 1 is a diagram showing a channel structure of a mobile communication system according to a first embodiment of the present invention.

Next, description will be given about embodiments of the present invention with reference to the drawings. FIG. 1 is a diagram showing a channel structure of a mobile communication system according to a first embodiment of the present invention. In FIG. 1, the mobile communication system according to the first embodiment of the present invention comprises a base station 1 and a plurality of mobile stations 2.

In this embodiment, the CDMA (Code Division Multiple Access) system is used as a radio access system. The base station 1 transmits a large quantity of packeted data to the mobile station 2 by the use of a high speed downlink shared channel called HS-PDSCH (High Speed-Physical Downlink Shared Channel). The data transmitted to the mobile station 2 reaches from a communication network (not illustrated) via a radio network controller (not illustrated) connected to the base station 1.

When it is necessary to transmit a large quantity of data to the plurality of mobile stations 2, the base station 1 carries out scheduling to determine order of data transmission to the respective mobile stations 2, and transmits the data to the respective mobile stations 2 in order. In this manner, one HS-PDSCH is used among the mobile stations in a time-shared manner.

The base station 1 sets an uplink dedicated control channel (UL-DPCH: Up Link-Dedicated Physical Channel) and a downlink dedicated control channel (DL-DPCH: Down Link-Dedicated Physical Channel) for exchanging information that serves for controlling data transmission to the mobile station 2. Further, the base station 1 transmits a common pilot channel (CPICH: Common Pilot Channel) at a predetermined power.

Figure 2:
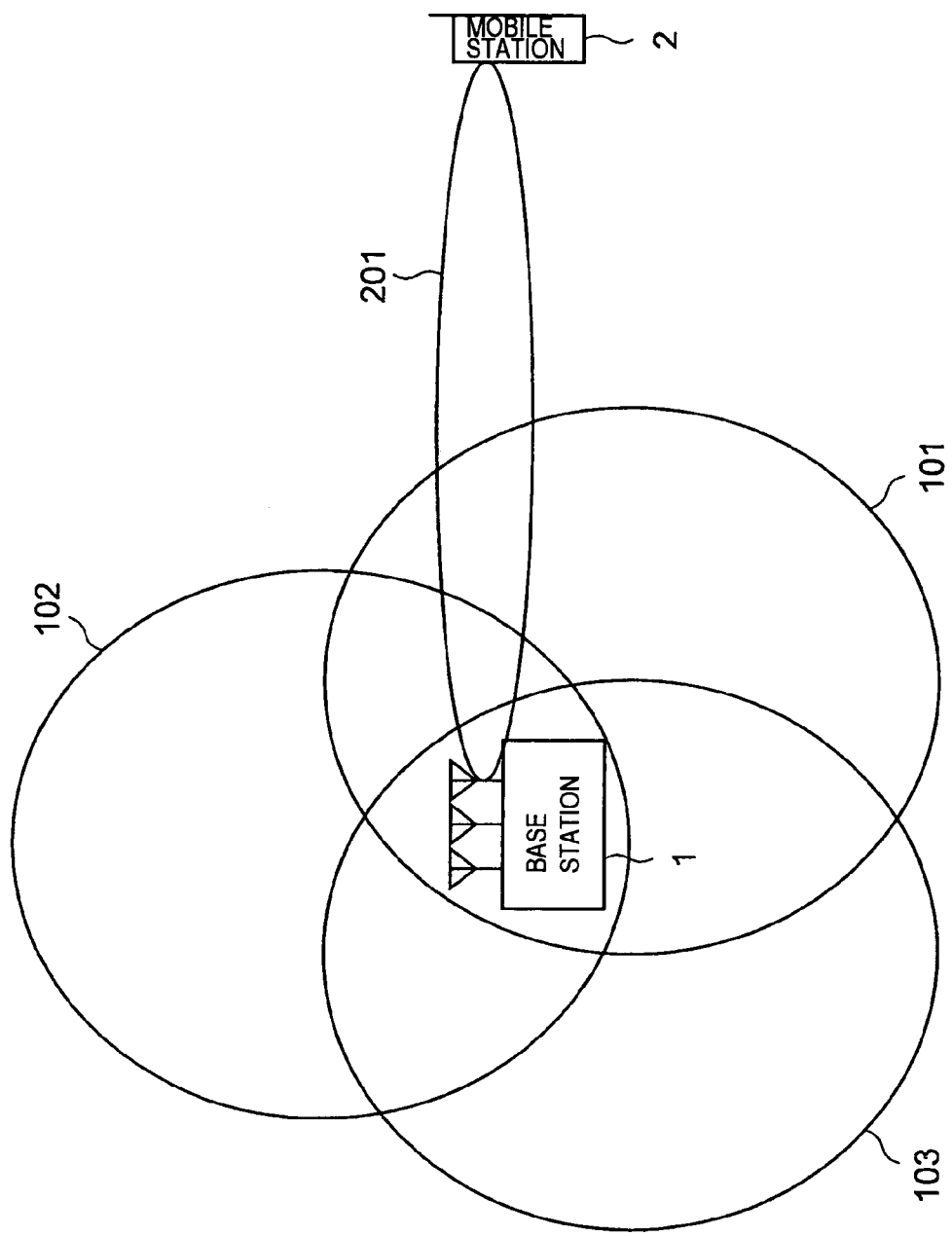
FIG. 2 is a block diagram showing a structure of the mobile communication system according to the first embodiment of the present invention.

FIG. 2 is a block diagram showing a structure of the mobile communication system according to the first embodiment of the present invention. As shown in FIG. 2, the base station 1 transmits different common pilot channels by respective beams 101 to 103 that are controlled in directivity by adaptive antennas. When the base station 1 transmits data to the mobile station 2, the base station 1 transmits the data channel (HS-PDSCH) and the downlink dedicated control channel (DL-DPCH) by the use of a beam 201 individually controlled in directivity. The mobile station 2 estimates a communication path quality by switching between the common pilot channel (CPICH) and the dedicated control channel.

Figure 3:
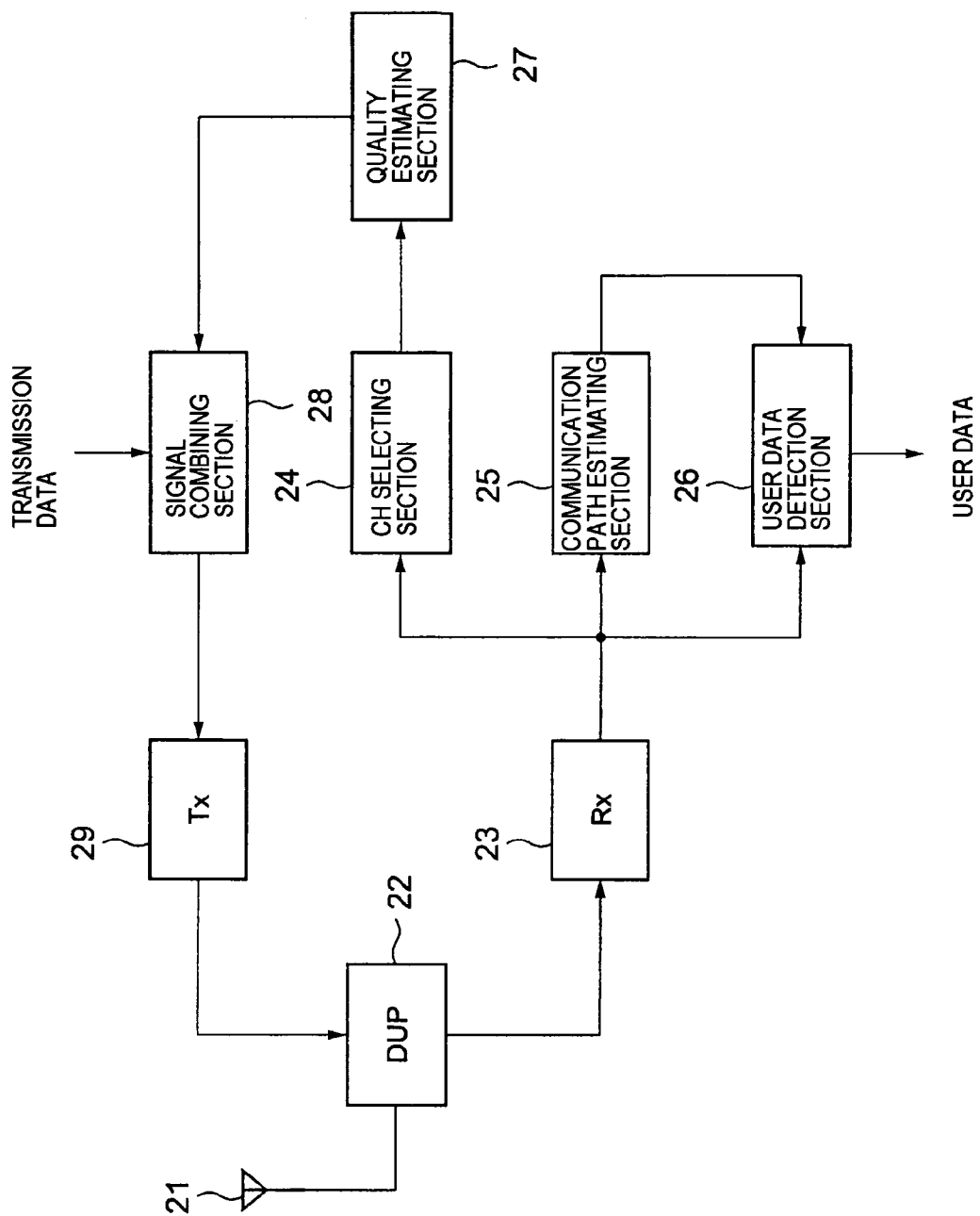
FIG. 3 is a block diagram showing a structure of a mobile station in FIG. 2.

FIG. 3 is a block diagram showing a structure of the mobile station 2 in FIG. 2. In FIG. 3, the mobile station 2 comprises an antenna 21, a transmission/reception duplex section (DUP: duplexer) 22, a receiving section (Rx) 23, a channel (CH) selecting section 24, a communication path estimating section 25, a user data detecting section 26, a quality estimating section 27, a signal combining section 28, and a transmission section (Tx) 29.

Figure 4:
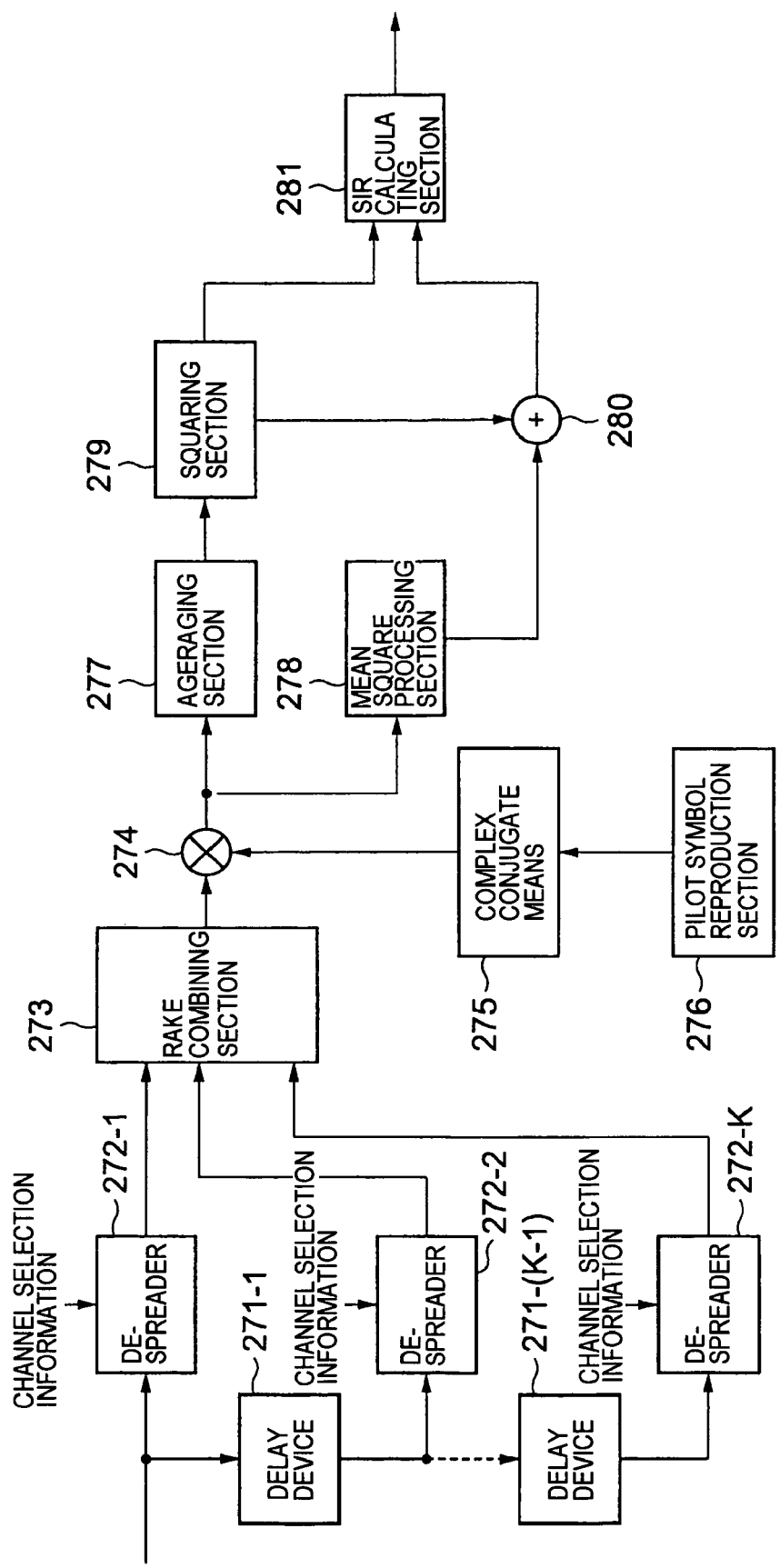
FIG. 4 is a block diagram showing a structure of a quality estimating section in FIG. 3.

FIG. 4 is a block diagram showing a structure of the quality estimating section 27 in FIG. 3. In FIG. 4, the quality estimating section 27 comprises delay devices 271-1 to 271-(K−1), despreaders 272-1 to 272-K, a Rake combining section 273, a multiplier 274, a complex conjugate means 275, a pilot symbol reproducing section 276, an averaging section 277, a mean square processing section 278, a squaring section 279, an adder 280, and an SIR (Signal to Interference Ratio) calculating section 281.

Referring to FIGS. 3 and 4, the structure of the mobile station 2 will be described. A signal received at the antenna 21 is inputted into the receiving section 23 by means of the transmission/reception duplex section 22 so as to be converted into a baseband signal. An output of the receiving section 23 is inputted into the channel selecting section 24 serving for communication path quality estimation, the quality estimating section 27, the communication path estimating section 25 that carries out communication path estimation of the user data channel, and the user data detecting section 26, respectively.

The communication path estimating section 25 derives a communication path factor of the user data channel and then notifies it to the user data detecting section 26. The user data detecting section 26 despreads the baseband signal inputted from the receiving section 23, demodulates user data by using the result of the communication path estimating section 25, and outputs the user data. The channel selecting section 24 makes a selection depending on the communication state as to which of the common pilot channel and the dedicated control channel is to be used for quality estimation of a communication path, and notifies the quality estimating section 27 of selection information indicative of which of the channels is to be used.

The quality estimating section 27 despreads the received signal by using the notified result of the channel selecting section 24 to thereby estimate a communication path quality of the channel. The structure of the quality estimating section 27 is as shown in FIG. 4.

In the quality estimating section 27, the received signal is delayed by the delay devices 271-1 to 271-(K−1) depending on path timing and inputted into the despreaders 272-1 to 272-K. Here, K represents the number of multipaths.

The despreaders 272-1 to 272-K select a code for use in despreading on the basis of the information (channel selection information) notified from the channel selecting section 24. Despread signals are combined by the Rake combining section 273 to thereby obtain a demodulation result. Since pilot symbols of both the common pilot channel and the dedicated control channel are known, the symbols can be reproduced in the pilot symbol reproducing section 276 synchronously with the timing.

The complex conjugate means 275 produces complex conjugates of the symbols reproduced in the pilot symbol reproducing section 276, and the multiplier 274 multiplies the demodulated signal from the Rake combining section 273 and the complex conjugates from the complex conjugate means 275 together. Among signals as a result of the multiplication per symbol, desired signal components all have the same phase.

Averaging and mean square calculation among slots are carried out in the averaging section 277 and the mean square processing section 278. An output of the averaging section 277 represents the mean amplitude of the desired signal components, while an output of the mean square processing section 278 represents the power of the whole received signal including a desired signal and interference signals.

The desired signal power is derived by the squaring section 279 and, by subtracting it from the result of the mean square processing section 278 by the use of the adder 280, an interference component is derived. The SIR calculating section 281 derives a ratio between the desired signal power from the squaring section 279 and the interference component from the adder 280 and sends its result to the signal combining section 28 as control information.

The result of the quality estimating section 27 is inputted into the signal combining section 28 as the control information along with uplink user data and sent to the transmission section 29. The transmission section 29 performs modulation of a signal to be transmitted, and this modulated signal is transmitted to the base station 1 from the transmission/reception duplex section 21.

Figure 5:
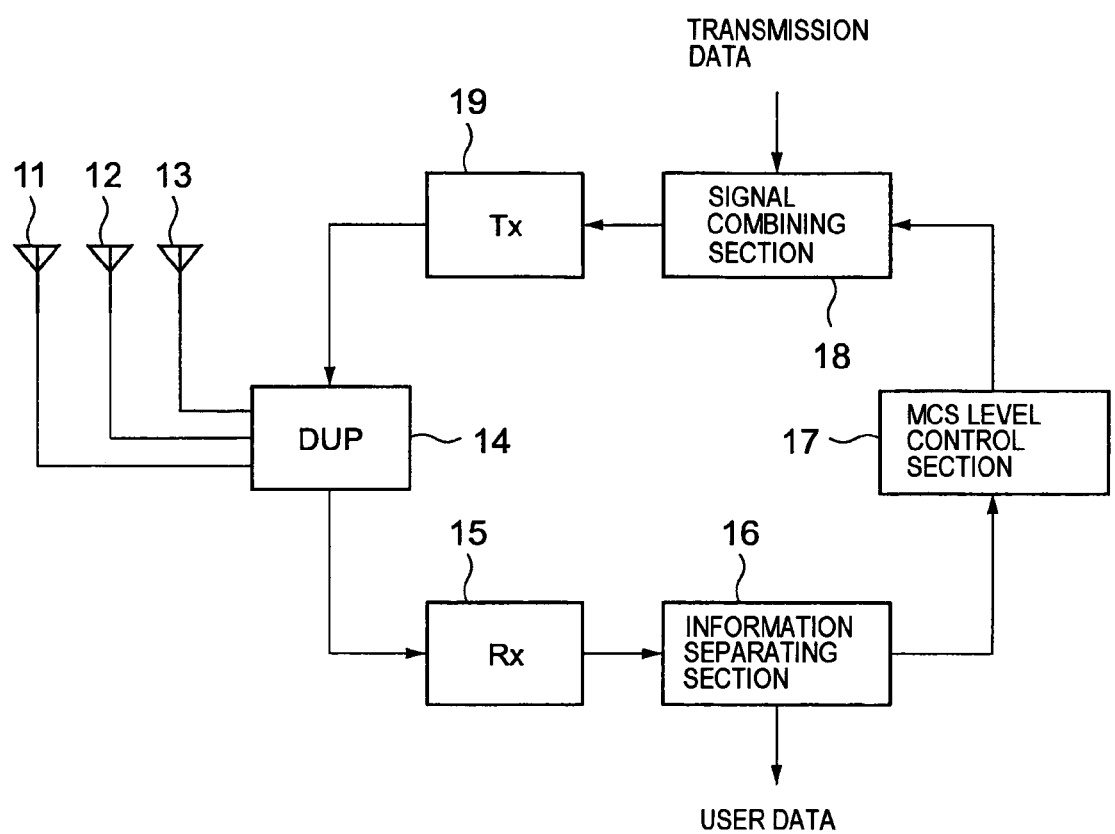
FIG. 5 is a block diagram showing a structure of a base station in FIG. 2.

FIG. 5 is a block diagram showing a structure of the base station 1 in FIG. 2. In FIG. 5, the base station 1 comprises antennas 11 to 13, a transmission/reception duplex section (DUP) 14, a receiving section (Rx) 15, an information separating section 16, an MCS (Modulation and Coding Scheme) level control section 17, a signal combining section 18, and a transmission section (Tx) 19.

Signals received at the antennas 11 to 13 are inputted into the receiving section 15 via the transmission/reception duplex section 14. The receiving section 15 sends a demodulation result to the information separating section 16. The information separating section 16 separates the uplink signals into control information and user data included therein.

Based on quality information included in the control information separated in the information separating section 16, the MCS level control section 17 determines a modulation system and a coding system for downlink, produces its result and control information, and sends them to the signal combining section 18. The signal combining section 18 combines the control information and user data to produce transmission information. The transmission information is applied with modulation in the transmission section 19 and transmitted to the mobile stations 2 via the transmission/reception duplex section 14.

Figure 6:
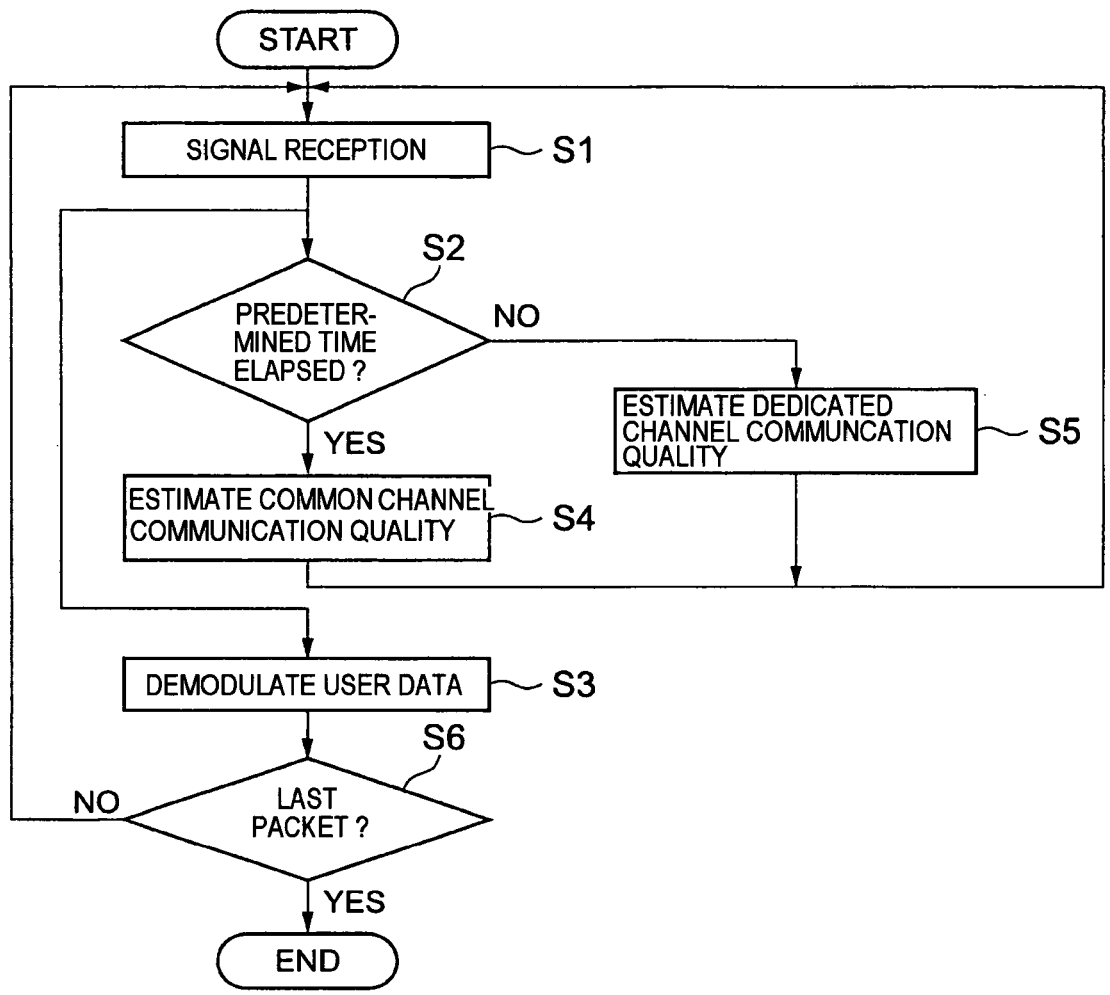
FIG. 6 is a flowchart showing operation of the mobile station in FIG. 2.
Figure 7:
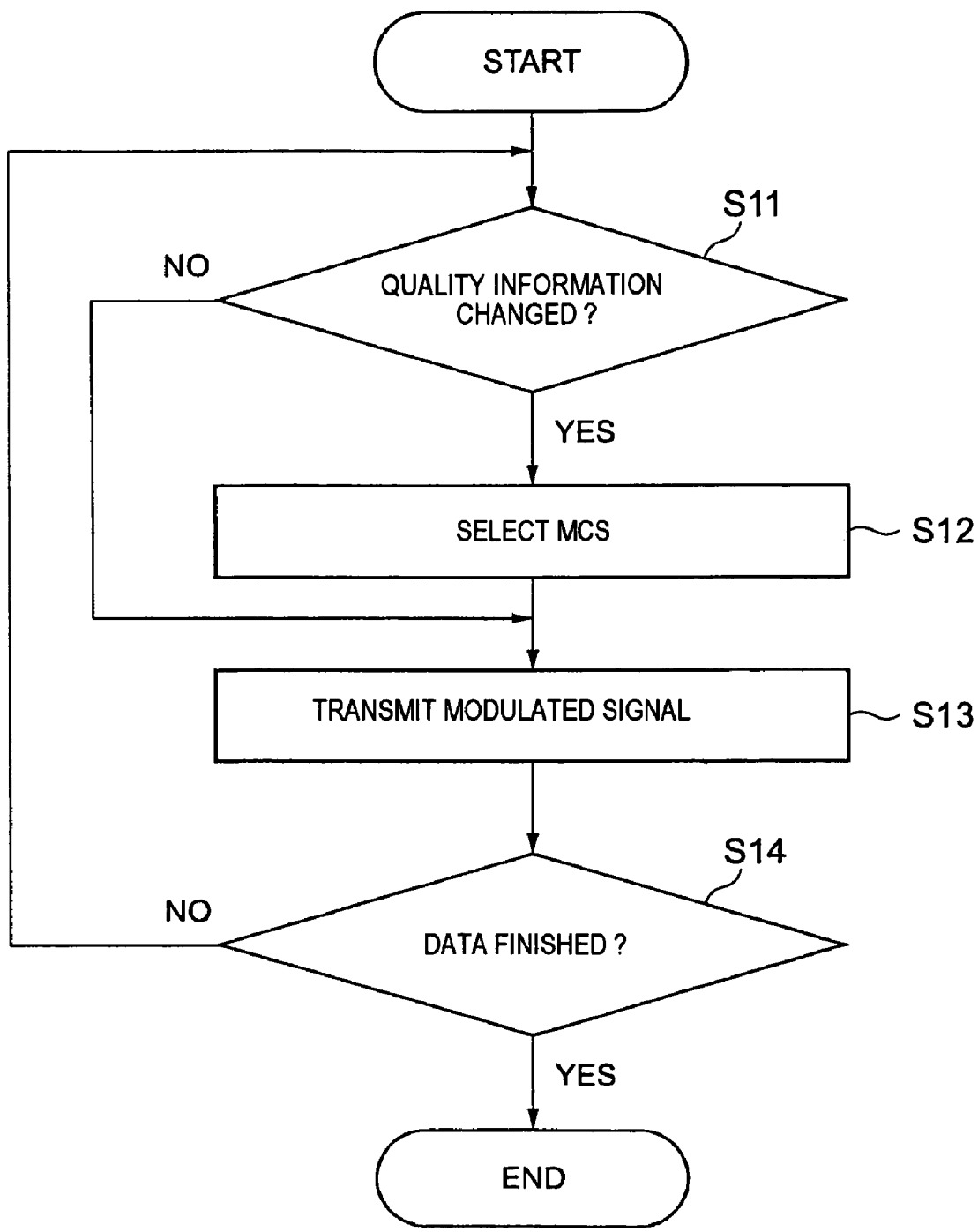
FIG. 7 is a flowchart showing operation of the base station in FIG. 2.

FIG. 6 is a flowchart showing operation of the mobile station 2 in FIG. 2, while FIG. 7 is a flowchart showing operation of the base station 1 in FIG. 2. Referring to FIGS. 2 to 7, the operation of the first embodiment of the present invention will be described. First, the operation of the mobile station 2 will be described. FIG. 6 shows the operation when a time is used as selection means.

When data is received (step S1 in FIG. 6), the mobile station 2 demodulates user data if present (step S3 in FIG. 6). Further, in selection of a channel to be used for estimation of the communication path quality, the mobile station 2 checks an elapsed time from a time instant when the user data was last received (step S2 in FIG. 6).

When a predetermined time has elapsed, the mobile station 2 uses the common pilot channel for quality estimation (step S4 in FIG. 6), while, when the user data is being received, the mobile station 2 uses the dedicated control channel for quality estimation (step S5 in FIG. 6), and the mobile station 2 uses a last estimated value within the predetermined time.

Until the user data is finished (step S6 in FIG. 6), the mobile station 2 repeats the foregoing operation. Here, the predetermined time can be determined, for example, depending on a moving speed of the mobile station 2.

Next, the operation of the base station 1 will be described with reference to FIG. 7. Prior to starting transmission of user data, the base station 1 judges whether or not the quality information from the mobile station 2 has changed (step S11 in FIG. 7). If the same as the last report, the base station 1 does not change the MCS level, but modulates the user data with the last MCS level and transmits it (step S13 in FIG. 7).

If there is a change in the quality information, the base station 1 selects an MCS level depending on the quality (step S12 in FIG. 7) and transmits the user data by modulating it using the newly selected MCS level. Until there is no data left to be transmitted to the mobile station 2 (step S14 in FIG. 7), the base station 1 repeats the foregoing processing.

As described above, in this embodiment, the mobile station 2 estimates the communication path quality by switching between the pilot channel individually controlled in directivity and the common pilot channel and selects the MCS level on the basis of its result, so that the system throughput can be improved.

This is because, since the selection of the MCS level that is the highest within the range satisfying the desired error rate can be realized, the improvement in system throughput can be achieved.

The reason thereof will be described in detail. First, the dedicated pilot channel is transmitted with the same directivity as that of packet data and is thus propagated in the same communication path. Therefore, the communication path quality of the dedicated pilot channel precisely represents the channel of the packet data, and therefore, the estimation accuracy can be improved as compared with the conventional system where the communication path quality is estimated only by the common pilot channel.

Further, when the dedicated pilot channel is not present, i.e. while waiting for packet data, approximate estimation of the communication path quality can be carried out by estimation using the common pilot channel. Here, the dedicated pilot channel is allocated when packets are transmitted again, so that, by switching the channel to be used from the common pilot channel with poor estimation accuracy to the dedicated pilot channel, it is possible to improve the estimation accuracy of the communication path quality.

From these points of view, in this embodiment, the optimum MCS level can be selected by improving the estimation accuracy of the communication path quality. Further, since a switching criterion the mobile station 2 uses in the quality estimation can be independently set by the mobile station 2 without receiving a notification from the base station 1, it is also a merit that an extra control from the base station 1 to the mobile station 2 is unnecessary so that the control is simple.

Figure 8:
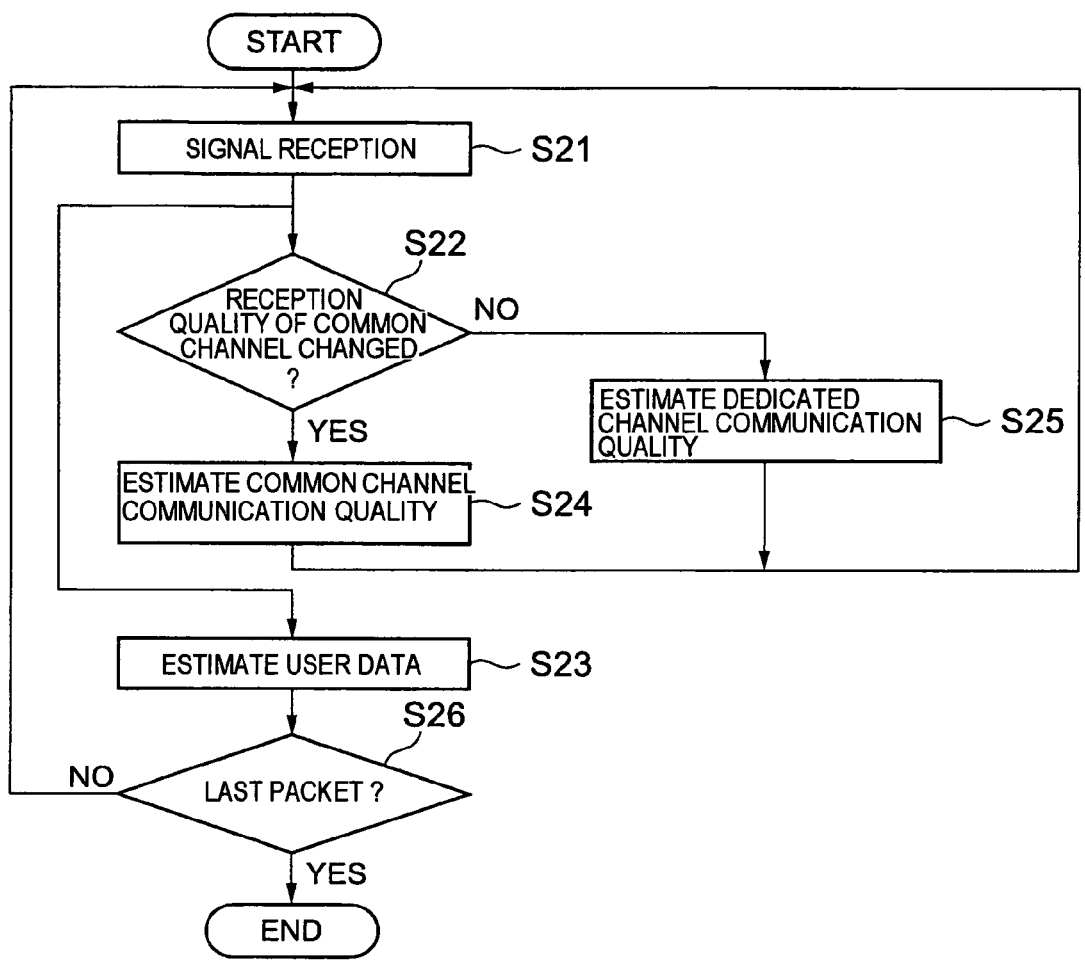
FIG. 8 is a flowchart showing operation of a mobile station according to a second embodiment of the present invention.

FIG. 8 is a flowchart showing operation of a mobile station according to a second embodiment of the present invention. The mobile station according to the second embodiment of the present invention is the same as the foregoing first embodiment of the present invention except that a reception quality of a common channel is used as selection means for a channel. Since structures of a system, a base station, and a mobile station are the same as those in the first embodiment of the present invention shown in FIGS. 1 to 5, respectively, the operation of the mobile station according to the second embodiment of the present invention will be described with reference to FIGS. 1 to 5 and 8.

When data is received (step. S21 in FIG. 8), a mobile station 2 demodulates user data if present (step S23 in FIG. 8). In selection of a channel to be used for estimation of a communication path quality, the mobile station 2 checks whether or not the reception quality of the common channel has changed, for detecting a change in environment (step S22 in FIG. 8).

When there is a change in reception quality of the common channel, the mobile station 2 uses the common pilot channel for quality estimation (step S24 in FIG. 8), while, when there is no change in reception quality of the common channel, the mobile station uses a dedicated control channel for quality estimation (step S25 in FIG. 8).

Until the user data is finished (step S26 in FIG. 8), the mobile station 2 repeats the foregoing operation. Here, since the change in environment agrees with the change in communication state, the proper channel selection can be carried out.

Figure 9:
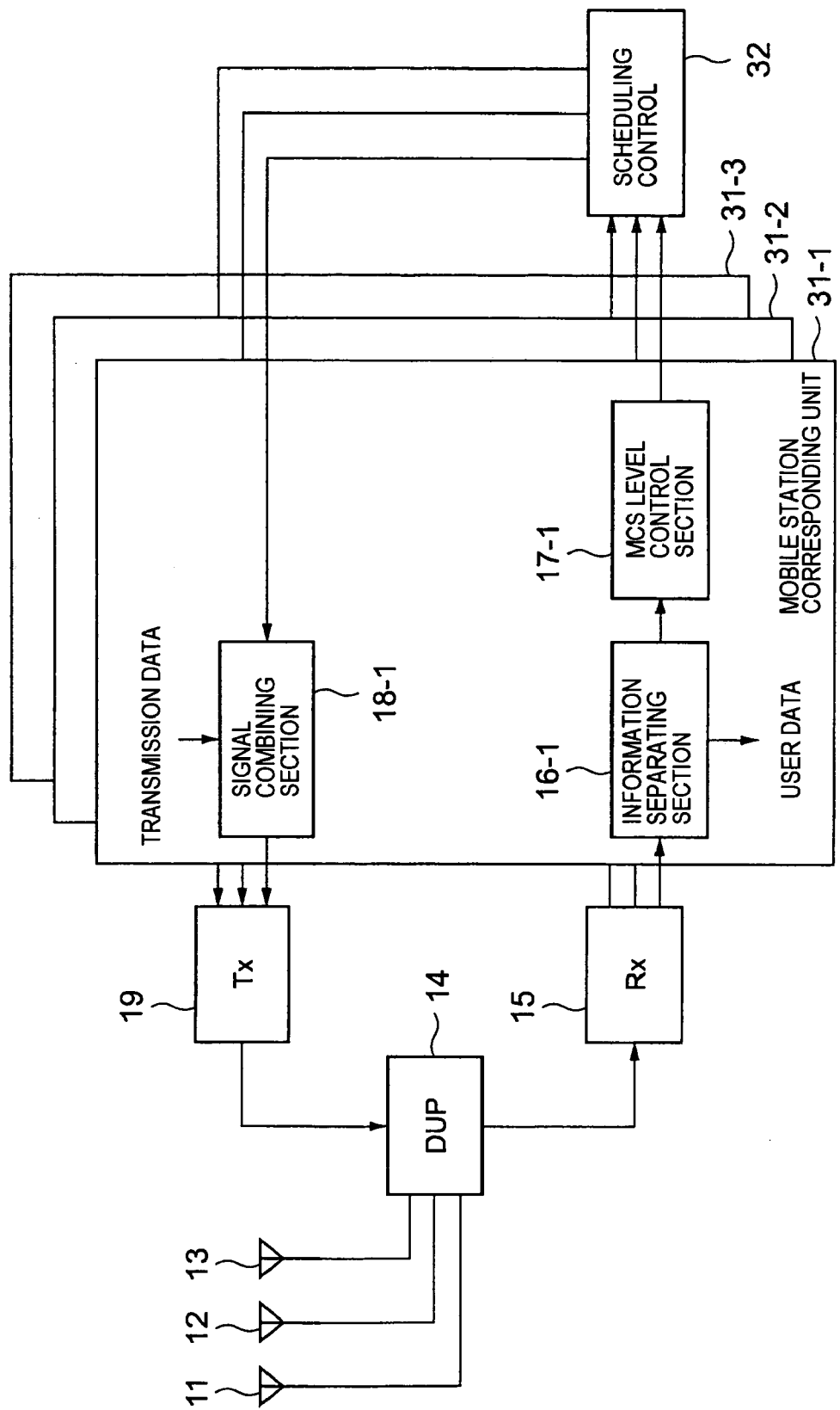
FIG. 9 is a block diagram showing a structure of a base station according to a third embodiment of the present invention.

FIG. 9 is a block diagram showing a structure of a base station according to a third embodiment of the present invention. Since structures of a system and a mobile station in the third embodiment of the present invention are the same as those in the first embodiment of the present invention, description thereof is omitted.

In FIG. 9, the base station according to the third embodiment of the present invention comprises antennas 11 to 13, a transmission/reception duplex section (DUP) 14, a receiving section (Rx) 15, mobile station corresponding units 31-1 to 31-3, a scheduling control section 32, and a transmission section (Tx) 19.

Further, the mobile station corresponding units 31-1 to 31-3 comprise information separating sections 16-1 to 16-3 (information separating sections 16-2 and 16-3 are not illustrated), MCS level control sections 17-1 to 17-3 (MCS level control sections 17-2 and 17-3 are not illustrated), and signal combining sections 18-1 to 18-3 (signal combining sections 18-2 and 18-3 are not illustrated).

Signals received at the antennas 11 to 13 are inputted into the receiving section 15 serving for respective mobile stations via the transmission/reception duplex section 14 and demodulated in the receiving section 15. The signals demodulated in the receiving section 15 are inputted into the signal separating sections 16-1 to 16-3 so as to be separated into user data and control signals.

Based on the separated control signals, MCS levels are set in the MCS level control sections 17-1 to 17-3. The MCS level and the communication path quality per mobile station are inputted into the scheduling control section 32. In the scheduling control section 32, those mobile stations to which transmission is to be made are determined on the basis of the communication path qualities notified from the mobile stations and the determined MCS levels. The MCS level information and the control information are, inputted into the signal combining sections 18-1 to 18-3.

The signal combining sections 18-1 to 18-3 of the mobile stations determined for transmission combine together transmission data and control signals and notify them to the transmission section 19. The transmission section 19 converts the outputs of the signal combining sections 18-1 to 18-3 serving for respective mobile stations and multiplexes them, and transmits them via the transmission/reception duplex section 14.

Figure 10:
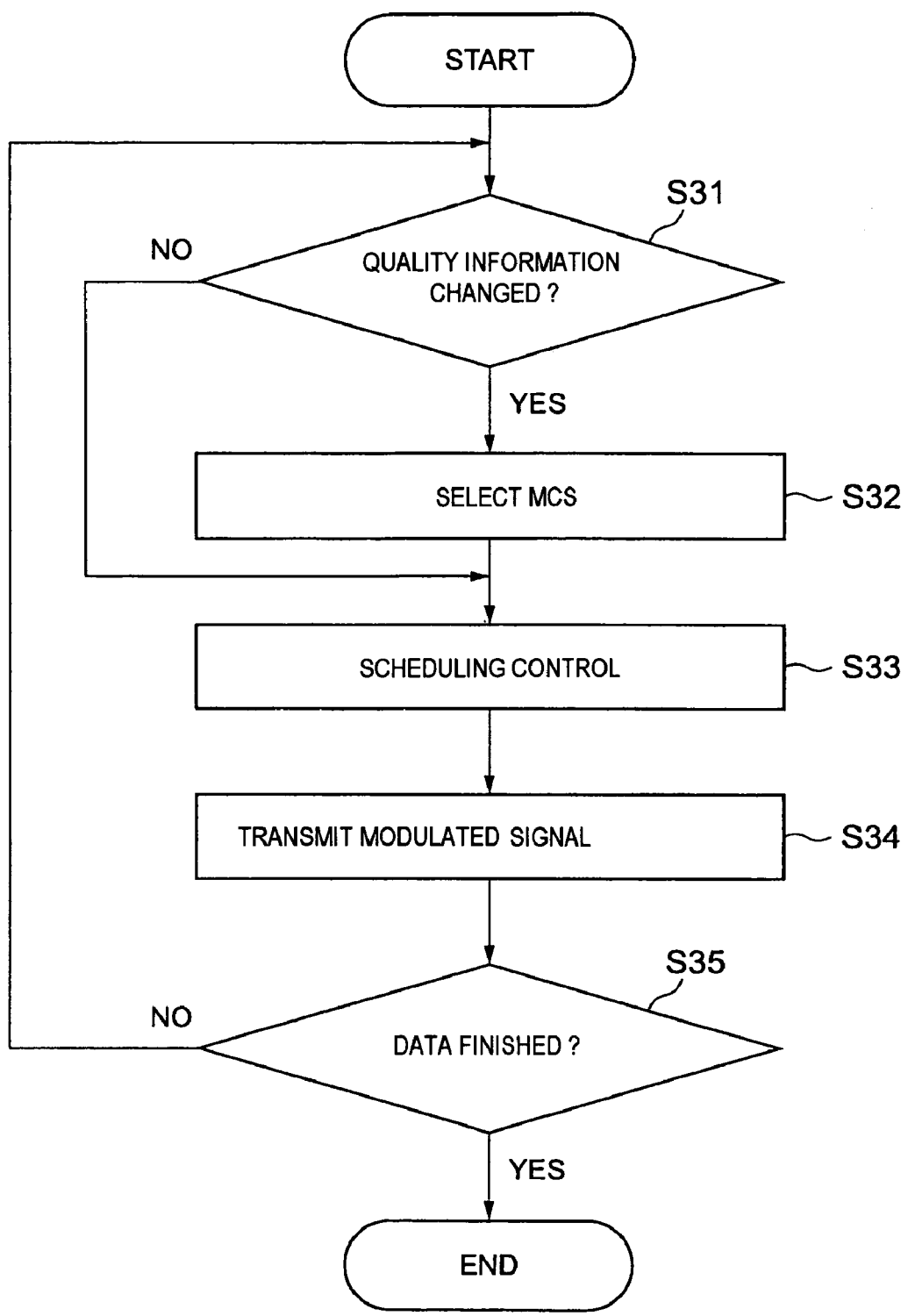
FIG. 10 is a flowchart showing operation of the base station in FIG. 9.

FIG. 10 is a flowchart showing operation of the base station in FIG. 9. Referring to FIGS. 9 and 10, description will be given about the operation of the base station according to the third embodiment of the present invention.

The base station carries out resetting of the MCS level based on the communication path quality notified from the mobile station. If there is no change in communication path quality (step S31 in FIG. 10), the base station notifies the quality information to the scheduling control section 32. If there is a change in communication path quality (step S31 in FIG. 10), the base station resets the MCS level (step S32 in FIG. 10) and notifies the scheduling control section 32 of a communication path quality and a new MCS level.

The scheduling control section 32 carries out scheduling of packet transmission by the use of the MCS level and the communication path quality that are notified per mobile station, to thereby determine to which mobile station packets are transmitted at the next time (step S33 in FIG. 10). The determination result of the scheduling control section 32 is notified per mobile station so that transmission data and control information are combined together according to the MCS level per mobile station so as to be transmitted (step S34 in FIG. 10).

Until there is no transmission data left (step S35 in FIG. 10), the base station carries out the foregoing MCS level setting and the foregoing scheduling of packet transmission.

In this embodiment, the scheduling can be efficiently performed with notifications of proper communication path qualities from the mobile stations. On the other hand, as shown in FIG. 6 or 8, the mobile station can notify the base station of the communication path quality based on the judgment criterion that is used in the communication path quality estimation.

As described above, in this embodiment, the mobile stations each switch between the channels that are used in estimation of the communication path quality and the base station performs the scheduling based on such qualities, and therefore, the selection of MCS levels and the scheduling based on those MCS levels can be realized on the basis of the communication path quality estimation with high estimation accuracy so that it is possible to improve the system throughput.

First, like in the first embodiment of the present invention, the mobile station can notify the base station of a highly accurate estimated value of the communication path quality.

Next, the base station carries out scheduling of packets by using the result of the highly accurate communication path quality estimation. Inasmuch as the MCS levels used in the scheduling can satisfy a desired error rate, the packet error rate can also satisfy a desired value, and therefore, the number of times of retransmission of packets can be reduced. As a result, the system throughput is improved.

Figure 11:
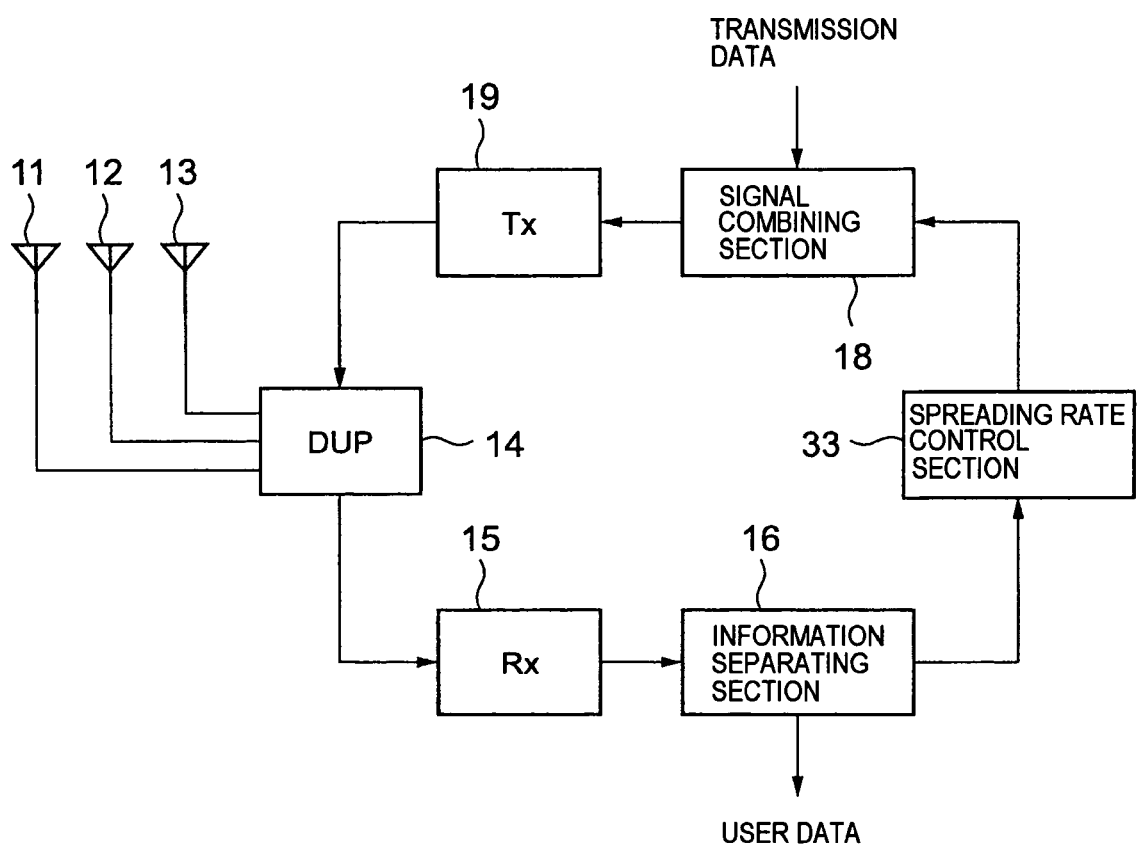
FIG. 11 is a block diagram showing a structure of a base station according to a fourth embodiment of the present invention.

FIG. 11 is a block diagram showing a structure of a base station according to a fourth embodiment of the present invention. Since structures of a system and a mobile station in the fourth embodiment of the present invention are also the same as those in the foregoing first embodiment of the present invention, description thereof is omitted.

In FIG. 11, the base station according to the fourth embodiment of the present invention comprises antennas 11 to 13, a transmission/reception duplex section (DUP) 14, a receiving section (Rx) 15, an information separating section 16, a spreading rate control section 33, a signal combining section 18, and a transmission section (Tx) 19.

Signals received at the antennas 11 to 13 are inputted into the receiving section 15 via the transmission/reception duplex section 14 and demodulated in the receiving section 15, and a result thereof is sent to the signal separating section 16. In the signal separating section 16, control information and user data included in the uplink signals are separated from each other.

The spreading rate control section 33 determines a downward spreading rate based on quality information included in the control information, produces its result and control information, and sends them to the signal combining section 18. The signal combining section 18 combines together the control information and user data to produce transmission information. The transmission information is modulated in the transmission section 19 and transmitted to mobile stations via the transmission/reception duplex section 14.

Figure 12:
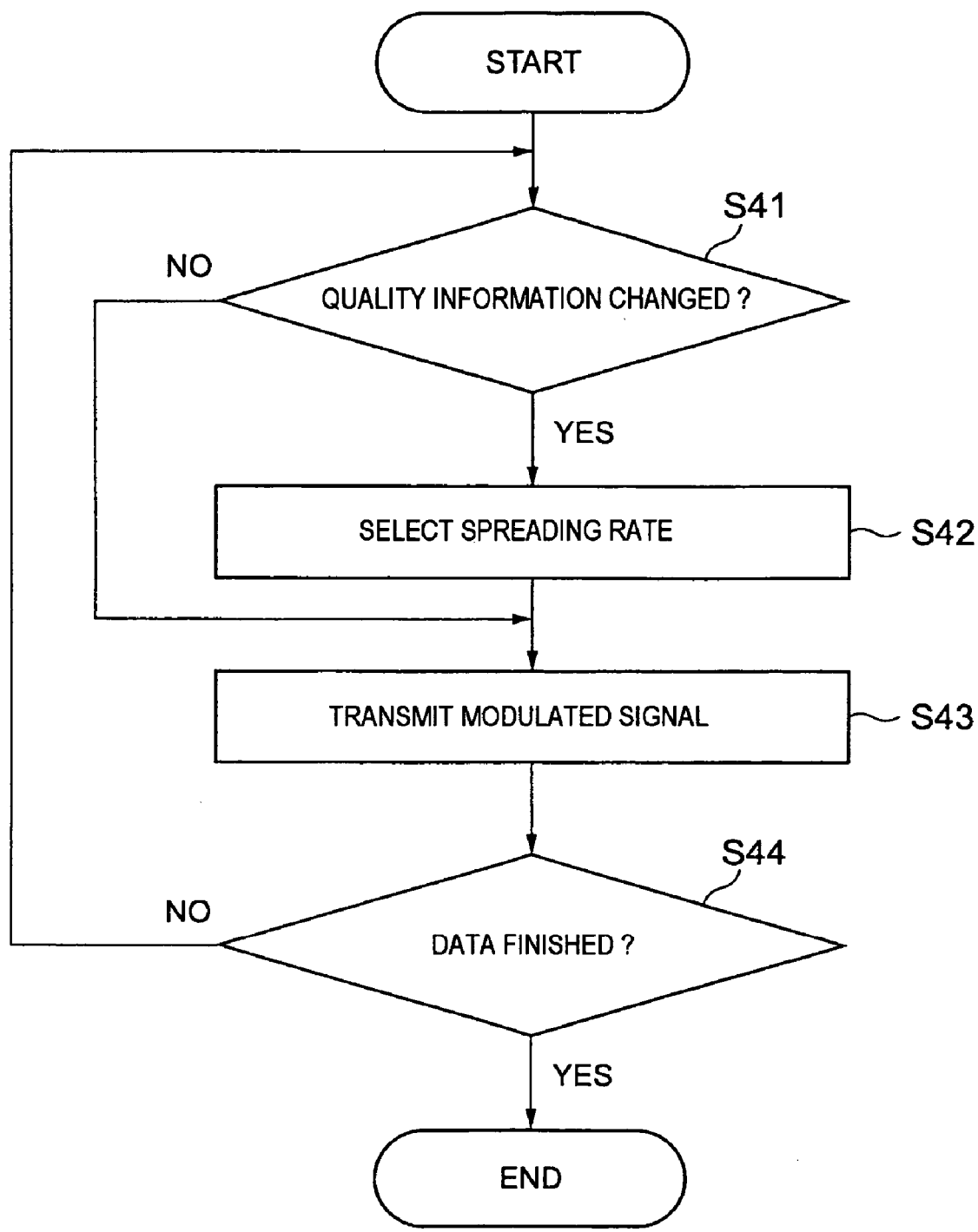
FIG. 12 is a flowchart showing operation of the base station in FIG. 11.

FIG. 12 is a flowchart showing operation of the base station in FIG. 11. Referring to FIGS. 10 and 12, description will be given about the operation of the base station according to the fourth embodiment of the present invention.

Prior to starting transmission of user data, the base station judges whether or not quality information from the mobile station has changed (step S41 in FIG. 12). If the same as the last report, the base station does not change the spreading rate, but modulates the user data with the last spreading rate and transmits it (step S43 in FIG. 12).

If there is a change in the quality information, the base station selects a spreading rate depending on the quality (step S42 in FIG. 12) and transmits the user data by modulating it using the newly selected spreading rate (step S43 in FIG. 12). Until there is no data left to be transmitted to the mobile station (step S44 in FIG. 12), the base station repeats the foregoing operation.

As described above, in this embodiment, the mobile station switches between the channels that are used in estimation of the communication path quality and the base station changes the spreading rate based on that quality, and therefore, the mobile station can notify the base station of a highly accurate estimated value of the communication path quality, and it is possible to realize selection of the spreading rate with the shortest period within the range satisfying the desired error rate, i.e. the high transmission rate. Consequently, the system throughput can be improved.

As described above, according to the present invention in accordance with the foregoing first to fourth embodiments, in the mobile communication system that uses the adaptive antenna in the base station and carries out the downlink data transmission to the mobile station, the mobile station estimates the communication path quality by switching between the downlink common pilot channel transmitted with a first directivity and the downlink dedicated control channel transmitted with a second directivity and notifies its estimation result to the base station, so that there is obtained an effect that the system throughput can be improved.

Next, a fifth embodiment of the present invention will be described with reference to FIGS. 1, 2, and 13. First, in order to receive data, a mobile station 2 sets a downlink dedicated control channel (DL-DPCH) and an uplink dedicated control channel (UL-DPCH) to thereby enable notification of control information to a base station 1. The mobile station 2 measures a communication path quality by receiving a common pilot channel (CPICH) at predetermined intervals, and notifies its result to the base station 1 by using the uplink dedicated control channel (UL-DPCH). The base station 1 receives notifications of communication path qualities from a plurality of mobile stations 2.

When data to be transmitted to the mobile station 2 arrives, the base station 1 adds that mobile station 2 to a data transmission waiting queue. The communication path qualities of the respective mobile stations 2 in the data transmission waiting queue are corrected by a later-described predetermined method. The base station 1 determines MCS (Modulation and Coding Scheme) levels of the respective mobile stations 2 based on the corrected communication path qualities, and selects the mobile station 2 to which data is transmitted at the next transmission timing, based on the MCS levels of the mobile stations 2 by using a scheduler.

The base station 1 notifies the selected mobile station 2 of the MCS level determined earlier by the use of the downlink dedicated control channel. Further, the base station 1 transmits data to the mobile station 2 with the MCS level determined earlier by the use of time slots of a high speed downlink shared channel set at a predetermined timing difference from such notification. After receiving the notification of the downlink dedicated control channel, the mobile station 2 receives the data by using the notified MCS level.

The base station 1 removes from the data transmission waiting queue the mobile station 2 for which transmission of data to be transmitted has been all finished. The measurement of communication path quality in the mobile station 2 is carried out per time slot of the high speed downlink shared channel either in a data receiving state or in a data waiting state. Then, the mobile station 2 transmits a measurement result to the base station 1 by using a first time slot of the uplink dedicated control channel that starts after a time slot where the mobile station 2 performed the measurement.

Figure 13:
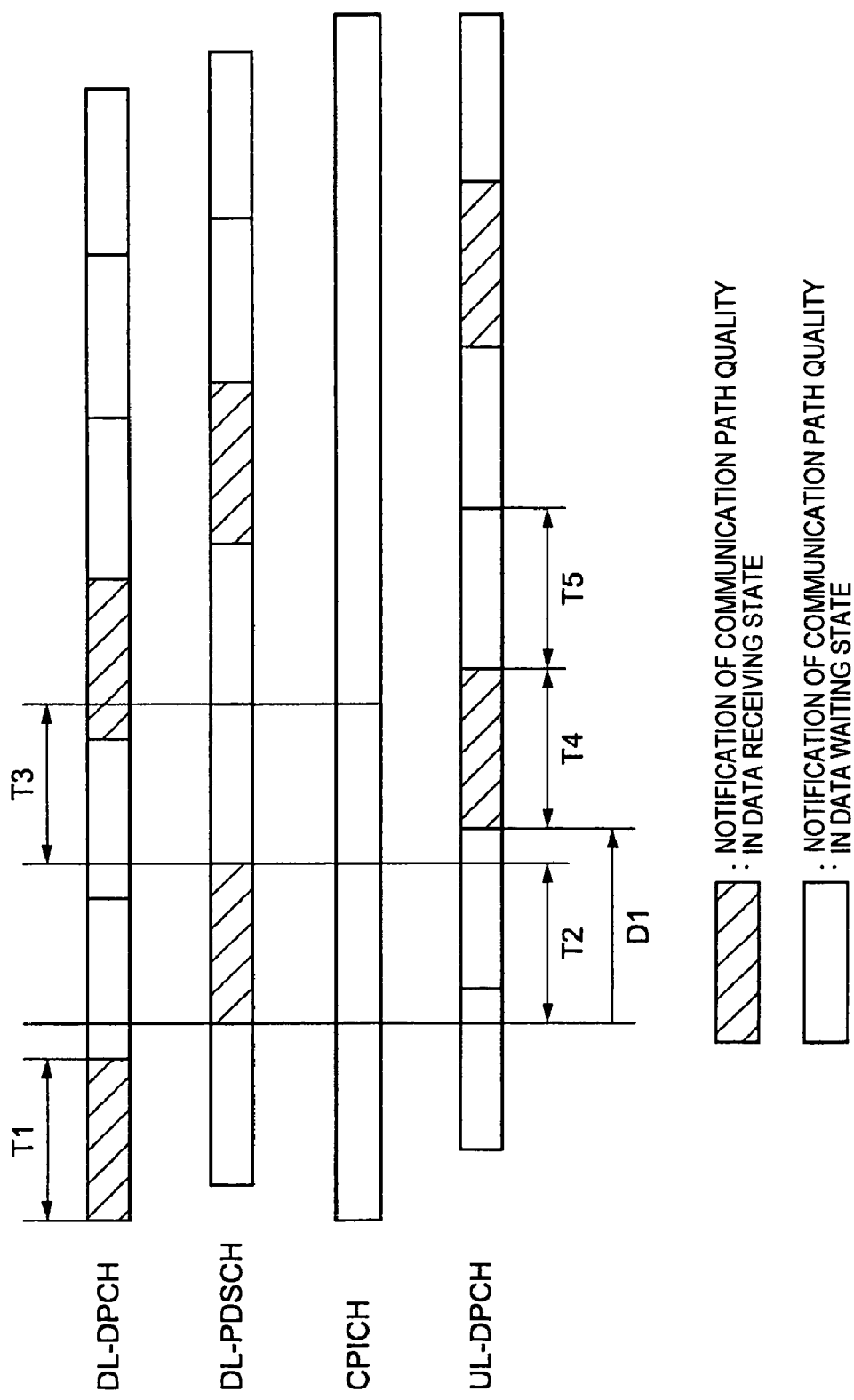
FIG. 13 is a timing chart showing timings among channels in a fifth embodiment of the present invention.

FIG. 13 is a timing chart showing timings among the channels in the sixth embodiment of the present invention. Hereinbelow, the timings of the mobile station 2 and the base station 1 will be described with reference to FIG. 13.

When the base station 1 makes notification of data transmission at timing of T1 (data transmission control information notification), data is transmitted at timing of T2 (data transmission and measurement of communication path quality in data receiving state) after the lapse of a predetermined delay time. The mobile station 2 measures a communication path quality at timing of T2 and notifies the communication path quality in the data receiving state at timing of T4 (notification of communication path quality in data receiving state) after the lapse of a delay time of D1 (transmission time difference between data transmission and notification of communication path quality measurement result).

However, since data is not transmitted at timing of T3 (measurement of communication path quality in data waiting state), a communication path quality in the data waiting state is notified at timing of T5 (notification of communication path quality in data waiting state).

Figure 14:
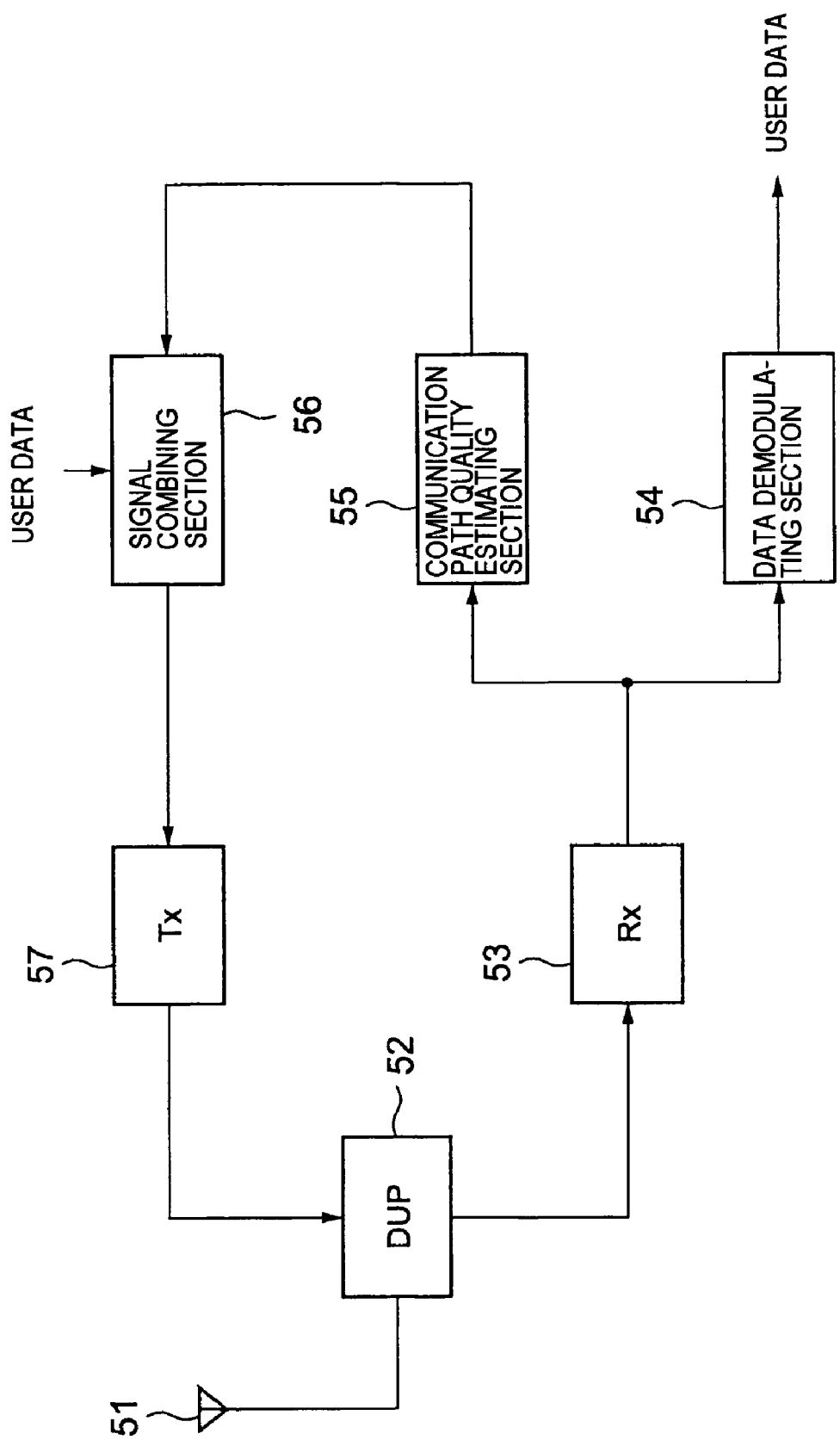
FIG. 14 is a block diagram showing a structure of a mobile station in FIG. 2.

FIG. 14 is a block diagram showing a structure of the mobile station 2 in FIG. 2. In FIG. 14, the mobile station 2 comprises an antenna 51, a transmission/reception duplex section (DPU: duplexer) 52, a receiving section (Rx) 53, a user data demodulating section 54, a communication path quality estimating section 55, a signal combining section 56, and a transmission section (Tx) 57.

A signal received at the antenna 51 is inputted into the receiving section 53 via the transmission/reception duplex section 52 and converted into a baseband signal. An output of the receiving section 53 is inputted into the user data demodulating section 54 and the communication path quality estimating section 55 that estimates a communication path quality. The user data demodulating section 54 demodulates user data and outputs the user data. The communication path quality estimating section 55 inputs an estimation result into the signal combining section 56 as control information.

The signal combining section 56 sends uplink user data and the control information to the transmission section 57 where modulation is carried out. A modulated user signal is sent to the base station 1 via the transmission/reception duplex section 52 and the antenna 51.

Figure 15:
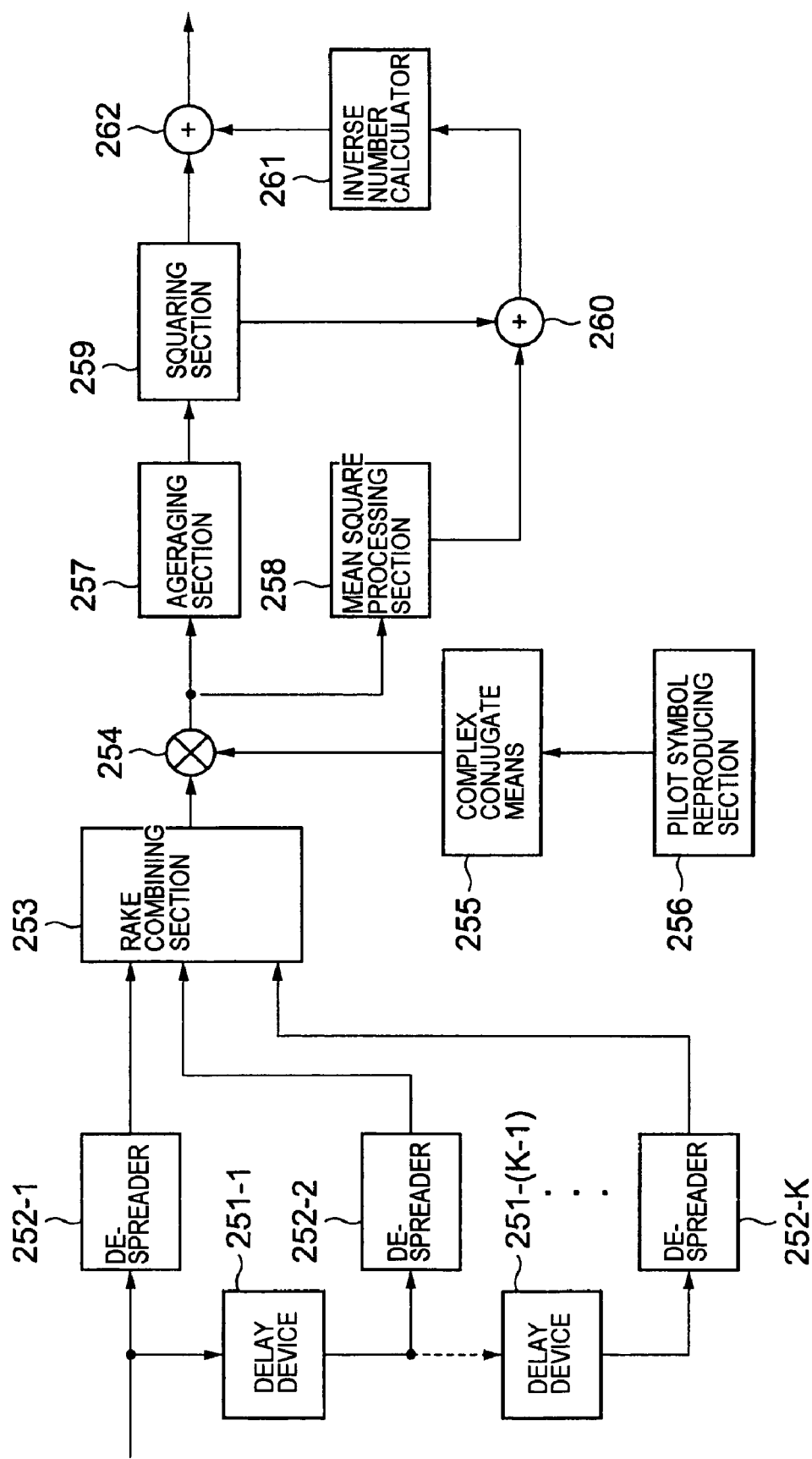
FIG. 15 is a block diagram showing a structure of a communication path quality estimating section in FIG. 14.

FIG. 15 is a block diagram showing a structure of the communication path quality estimating section 25 in FIG. 14. In FIG. 15, the communication path quality estimating section 25 comprises delay devices 251-1 to 251-(K−1), despreaders 252-1 to 252-K, a Rake combining section 253, a multipliers 254 and 262, a complex conjugate means 255, a pilot symbol reproducing section 256, an averaging section 257, a mean square processing section 258, a squaring section 259, an adder 260, and an inverse number calculator 261.

The baseband signal outputted from the receiving section 23 is delayed by the delay devices 251-1 to 251-(K−1) depending on path timing and inputted into the despreaders 252-1 to 252-K. Here, K represents the number of multipaths. The despreaders 252-1 to 252-K despread delayed signals. A received signal x(t) before despreading is given by the following equation (1) by using a signal xk(t) of a k-th path. Here, τk represents a path delay time.

$$x(t) = \sum_{k=0}^{K-1} x_k(t - \tau_k) \quad (1)$$

The k-th path is given by the following equation (2). Here, p and u represent a pilot channel and a user dedicated data channel, respectively. A user is identified by i. A represents a complex amplitude including a communication path distortion, d data, and c a spreading code.

$$x_k(t) = A_{p,k}(t) d_p(t) c_p(t) + \sum_i A_{u,i,k}(t) d_{u,i}(t) c_{u,i}(t) \quad (2)$$

A despread output of the k-th path in the pilot channel is given by the following equation (3). Here, αk,n represents an autocorrelation value of codes used in a k-th path and an n-th path of the pilot channel, while βk,n represents a cross-correlation value of codes used in a k-th path of the pilot channel and an n-th path of the data channel. Further, Tp represents a symbol length.

$$y_p^k(t) = \frac{1}{T_p} \int x(t) c_k(t) dt \qquad (3)$$

$$= A_{p,k}(t) d_p(t) + \frac{1}{T_p} \int \sum_{n=0}^{K-1} x_n(t - \tau_n) c_p(t - \tau_k) dt$$

$$= A_{p,k}(t) d_p(t) + \sum_{\substack{n=0 \\ n \neq k}}^{K-1} (\alpha_{k,n} A_{p,n}(t) d_p) t + \sum_i \beta_{k,n} A_{u,i,k}(t) d_{u,i}(t))$$

The Rake combining section 253 combines all despread outputs to obtain a demodulation result. Further, since pilot symbols of the pilot channel are known, the symbols can be reproduced in the pilot symbol reproducing section 256 synchronously with the timing. The complex conjugate means 255 produces complex conjugates of the reproduced symbols, and the multiplier 254 multiplies the complex conjugates by the demodulated signal. As a result of the multiplication, demodulated pilot signals all have the same phase.

Here, an output r(m) of the multiplier 254 is given by the following equation (4) where m represents a sampling timing in terms of symbol interval. In the equation, $\overline{A}$ represents an estimated value of A.

$$r(m) = S_p^*(m) \sum_k y_p^k(m) \frac{\overline{A}_p^{k*}}{|\overline{A}_p^k(m)|} \qquad (4)$$

In the averaging section 257 and the mean square processing section 258, averaging and mean square calculation are carried out among slots. An output of the averaging section 257 represents the mean amplitude of a desired signal, while an output of the mean square processing section 258 represents the power of the signals including the desired signal and interference signals. Subsequently, the desired signal power is derived by the squaring section 259 and, by subtracting the output of the squaring section 259 from the output of the mean square processing section 258 by the use of the adder 260, the interference signal power is derived.

Therefore, an output S of the squaring section 259 and an output I of the adder 260 are given by the following equations (5) where N represents the average number of symbols.

$$S = \left(\frac{1}{N} \sum r(m)\right)^2 \qquad (5)$$

$$I = \left(\frac{1}{N} \sum r^2(m)\right) - S$$

By calculating a ratio between the thus derived interference power and signal power by the use of the inverse number calculator 261 and the multiplier 262, the signal power to interference power ratio (SIR: Signal to Interference Ratio) is derived.

Although the description has been given about the case where the communication path quality is estimated by using the pilot channel (CPICH), the same processing applies to a case where the data channel (HS-PDSCH) is used. That is, by adding pilot symbols to part of the data channel and using those pilot symbols, the communication path quality can be estimated in totally the same manner as in case of using the pilot symbols of the pilot channel.

Figure 16:
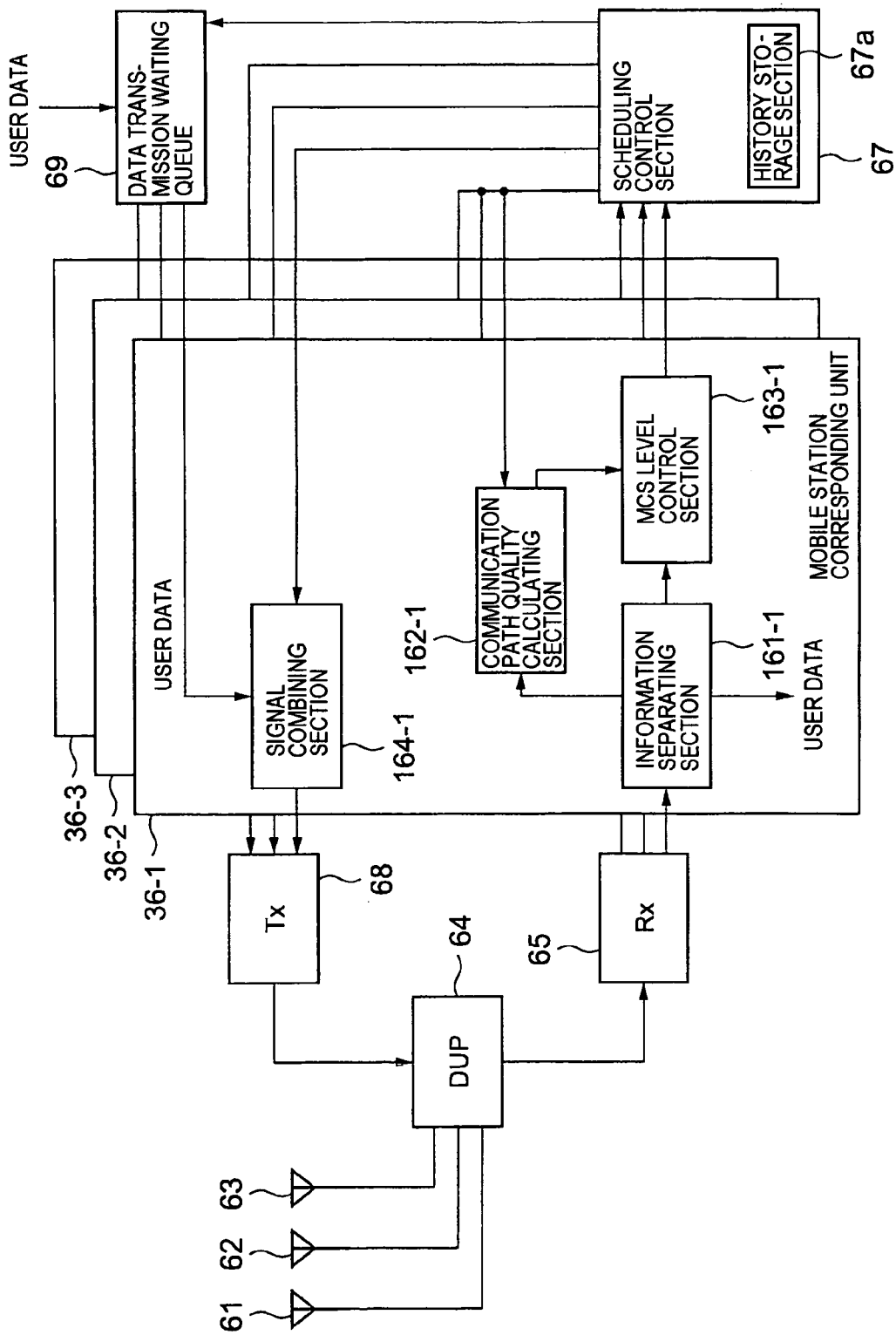
FIG. 16 is a block diagram showing a structure of a base station in FIG. 2.

FIG. 16 is a block diagram showing a structure of the base station 1 in FIG. 2. In FIG. 16, the base station 1 comprises antennas 61 to 63, a transmission/reception duplex section (DUP) 64, a receiving section (Rx) 65, mobile station corresponding units 36-1 to 36-3, a scheduling control section 67, a transmission section (Tx) 68, and a data transmission waiting queue 69.

The mobile station corresponding units 36-1 to 36-3 respectively comprise information separating sections 161-1 to 161-3 (information separating sections 161-2 and 161-3 are not illustrated), communication path quality calculating sections 162-1 to 162-3 (communication path quality calculating sections 162-2 and 162-3 are not illustrated), MCS level control sections 163-1 to 163-3 (MCS level control sections 163-2 and 163-3 are not illustrated), and signal combining sections 164-1 to 164-3 (signal combining sections 164-2 and 164-3 are not illustrated). The scheduling control section 67 is provided with a history storage section 67a storing a history of a scheduling control.

Signals received at the antennas 61 to 63 are inputted into the receiving section 65 via the transmission/reception duplex section 64. The receiving section 65 sends demodulation results to the information separating sections 161-1 to 161-3. In the information separating sections 161-1 to 161-3, control information and user data included in the uplink signals are separated from each other. The control information is inputted into the communication path quality calculating sections 162-1 to 162-3. In the communication path quality calculating sections 162-1 to 162-3, communication path qualities notified from the mobile stations 2 are corrected.

In this correction, the communication path qualities measured by the mobile stations 2 in the data waiting state and the communication path qualities measured by the mobile stations in the data receiving state are discriminately used. Therefore, when data had been transmitted to a mobile station 2 in a time slot of the high speed downlink shared channel (HS-PDSCH) that was finished immediately before the start of a time slot of the uplink dedicated control channel (UL-DPCH) which is used for notification of a communication path quality from that mobile station 2, the base station 1 judges that the notified communication path quality was measured in the data receiving state, while, otherwise, judges that it was measured in the data waiting state.

Then, use is made of the newest k communication path qualities measured by the mobile station 2 in the data waiting state and the newest k communication path qualities measured by the mobile station 2 during data reception. Here, in the data waiting state and the data receiving state, k-th (k>0) new communication path qualities are given as SIRw(k) and SIRr(k), respectively. Assuming that the numbers of data used for averaging during data waiting and data receiving are Nw(>0) and Nr(>0), respectively, the mean communication path qualities for the respective states are given by the following equations (6), respectively. Here, αk and βk are weighted mean coefficients that satisfy Σαk=1 (Σ is the sum of k=1 to Nw) and Σβk=1 (Σ is the sum of k=1 to Nr), respectively.

$$SIR_w = \sum_{k=1}^{N_w} \alpha_k SIR_w(k) \quad (6)$$

$$SIR_r = \sum_{k=1}^{N_r} \beta_k SIR_r(k)$$

Next, a ratio D between these mean communication path qualities for the respective states is calculated based on the following equation (7).

$$D = SIR_r / SIR_w \quad (7)$$

Finally, calculation of a communication path quality SIR is carried out as follows according to the state of the mobile station 2. In case where the newest communication path qualities are measured in the data waiting state, the communication path quality SIR is given by the following equation (8).

$$SIR = rDSIR_w \quad (8)$$

In case where the newest communication path qualities are measured in the data receiving state, the communication path quality SIR is given by the following equation (9).

$$SIR = SIR_r \quad (9)$$

Although r is a constant of 0 to 1, it is herein set that r is 1.

The corrected communication path qualities are inputted into the MCS level control sections 163-1 to 163-3. The MCS level control sections 163-1 to 163-3 determine MCS levels based on the inputted communication path qualities. The MCS level determination is processed per user and its result is sent to the scheduling control section 67. The scheduling control section 67 carries out scheduling based on the information from the MCS level control sections 163-1 to 163-3, produces control information per user, and sends it to the signal combining sections 164-1 to 164-3.

The signal combining sections 164-1 to 164-3 combine the control information and user data together to produce transmission information. The transmission information is modulated in the transmission section 68 and transmitted to the mobile stations 2 via the transmission/reception duplex section 64 and the antennas 61 to 63. Here, when data (user data) to be transmitted to the mobile station 2 arrives, the base station 1 adds that mobile station 2 to the data transmission waiting queue 69. The communication path qualities of the respective mobile stations 2 in the data transmission waiting queue 69 are corrected by the foregoing method. The base station 1 determines MCS levels of the respective mobile stations 2 based on the corrected communication path qualities, and selects the mobile station 2 to which data is transmitted at the next transmission timing, based on the MCS levels of the mobile stations 2 by using the scheduling control section 67.

In this embodiment, the base station 1 averages the desired signal to interference power ratios in the communication state of the mobile station 2 and the desired signal to interference power ratios in the standby state thereof. Multipath interference is caused in the data receiving state (communication state), while, in the data waiting state (standby state), even when data are transmitted to other mobile stations, those signals are separated by the directivity so that the interference power is reduced.

However, in this embodiment, the ratio therebetween (difference in dB notation) is derived to thereby derive a communication path quality compensated for the multipath interference even in the standby state. Therefore, regardless of the ratio in time between the communication state and the waiting state, or regardless of the communication state or the waiting state, the communication path quality derived by the base station 1 represents a communication path quality in the constant condition.

Therefore, improvement or degradation of the notified communication path quality is not affected by the ratio in time between the communication state and the waiting state, or the like, but exhibits improvement or degradation of the communication path quality. Consequently, it is possible to realize selection of a proper MCS level that prevents such a situation where packet errors increase when the MCS level is raised depending on improvement in notified communication path quality.

Further, in this embodiment, notification of the communication path qualities is requested to all mobile stations 2 in the constant condition and the scheduling is carried out based on those communication path qualities, and therefore, even if the adaptive antenna is applied, it is possible to perform comparison in the same condition with respect to all mobile stations 2.

Moreover, in this embodiment, it is possible to prevent such a phenomenon that occurs when there is a difference in communication path quality depending on the states, wherein the communication state and the standby state are alternately switched among the mobile stations 2 during scheduling. As a result, the scheduler selects the mobile station 2 with the highest MCS level among MCS levels that satisfy the predetermined error rate, and therefore, the system throughput is improved.

As described above, in this embodiment, the communication path quality estimated value is calculated in the constant condition that is not affected by the communication state immediately before, and the MCS is selected based on its estimation result, so that the system throughput can be improved.

A sixth embodiment of the present invention differs from the fifth embodiment of the present invention in that the base station 1 does not correct the communication path quality, but the mobile station 2 performs all correction thereof. A mobile communication system according to the sixth embodiment of the present invention has the same system structure as that of the fifth embodiment of the present invention, and therefore, description thereof is omitted.

Figure 17:
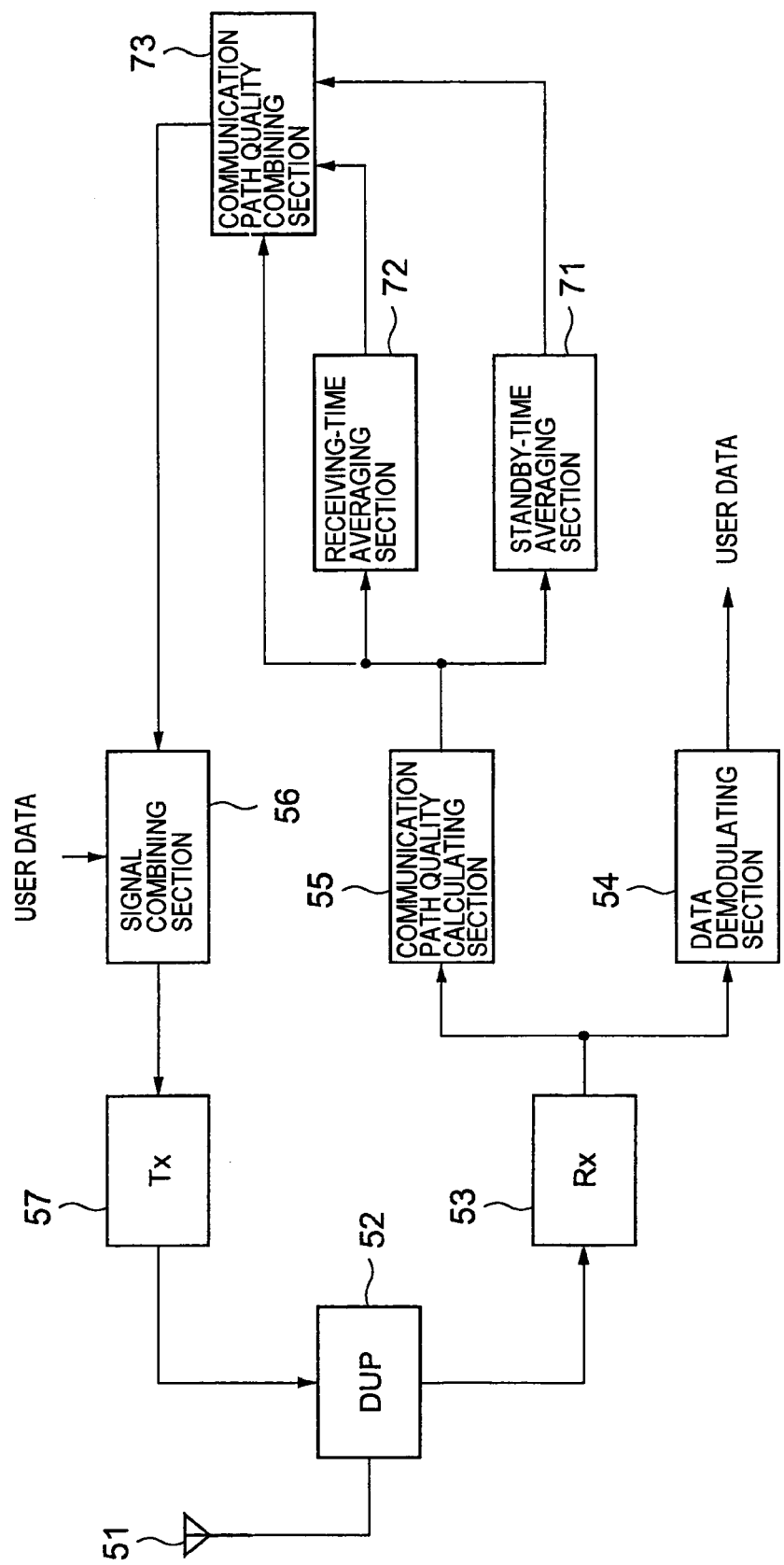
FIG. 17 is a block diagram showing a structure of a mobile station according to a sixth embodiment of the present invention.

FIG. 17 is a block diagram showing a structure of a mobile station 2 according to the sixth embodiment of the present invention. In FIG. 17, the mobile station 2 according to the sixth embodiment of the present invention has the same structure as that of the mobile station 2 according to the fifth embodiment of the present invention shown in FIG. 14 except that there are provided a standby-time averaging section 31, a receiving-time averaging section 32, and a communication path quality combining section 33, and the same components are assigned the same symbols.

A signal received at an antenna 51 is inputted into a receiving section (Rx) 53 via a transmission/reception duplex section (DUP) 52 and converted into a baseband signal. An output of the receiving section 53 is inputted into a user data demodulating section 54 and a communication path quality estimating section 55. The user data demodulating section 54 demodulates user data and outputs the user data. The communication path quality estimating section 55 calculates a communication path quality like the communication path quality estimating section 55 according to the fifth embodiment of the present invention shown in FIG. 15.

An output of the communication path quality estimating section 55 is averaged in the standby-time averaging section 71 or the receiving-time averaging section 72 depending on the state of communication. The averaging method is carried out like in the foregoing first embodiment of the present invention. Further, the communication path quality combining section 73 corrects the output of the communication path quality estimating section 55 depending on the state of communication by using a difference between an output of the standby-time averaging section 71 and an output of the receiving-time averaging section 72. An output of the communication path quality combining section 73 is inputted into a signal combining section 56 as control information.

The signal combining section 56 combines uplink user data and the control information together and sends them to a transmission section (Tx) 57 where modulation is carried out. A modulated user signal is sent to the base station 1 via the transmission/reception duplex section 52 and the antenna 51.

Figure 18:
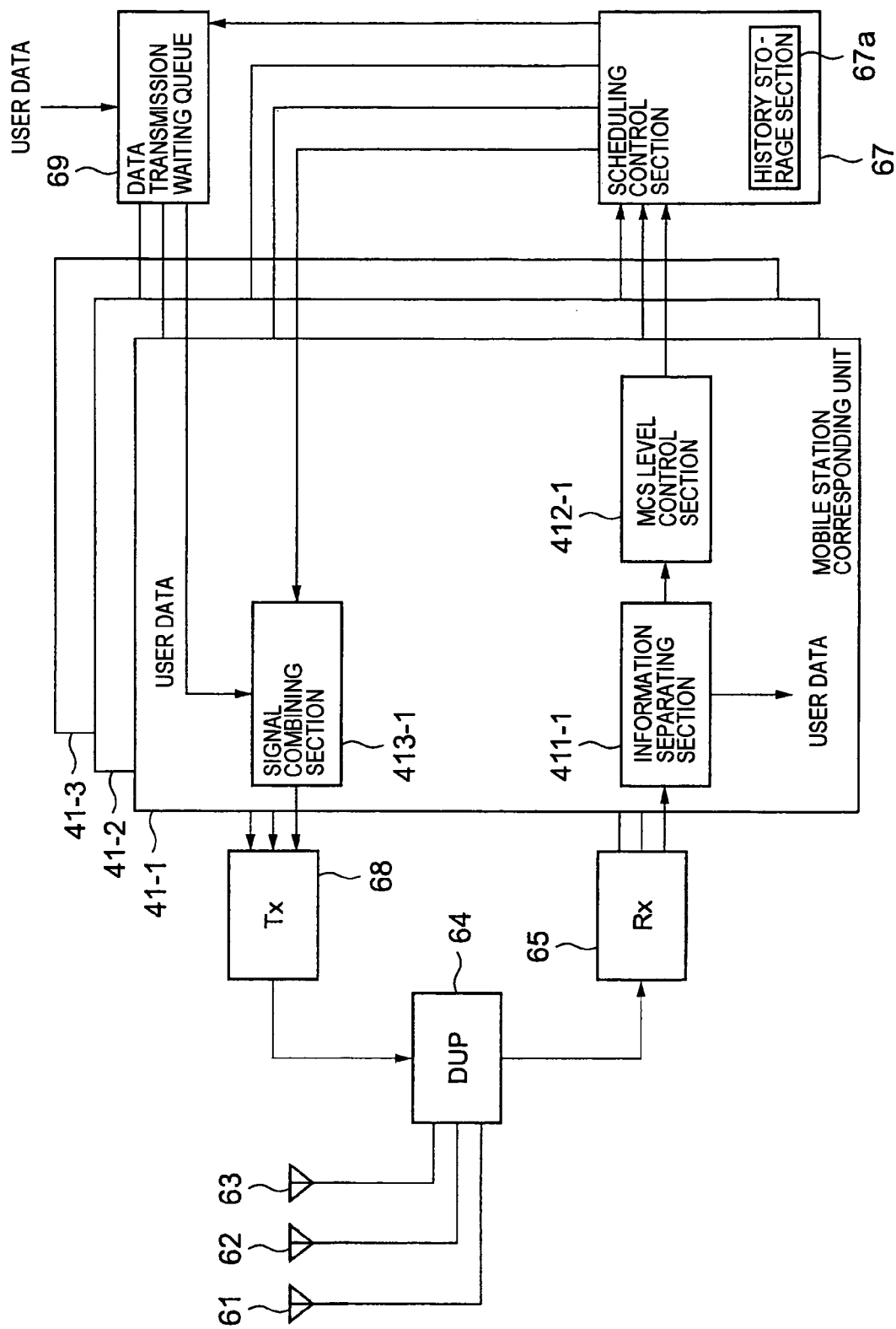
FIG. 18 is a block diagram showing a structure of a base station according to the sixth embodiment of the present invention.

FIG. 18 is a block diagram showing a structure of the base station 1 according to the sixth embodiment of the present invention. In FIG. 18, the base station 1 according to the sixth embodiment of the present invention has the same structure as that of the base station 1 according to the fifth embodiment of the present invention shown in FIG. 16 except that there is a difference in structure of mobile station corresponding units 41-1 to 41-3, and the same components are assigned the same symbols. The mobile station corresponding units 41-1 to 41-3 respectively comprise information separating sections 411-1 to 411-3 (information separating sections 411-2 and 411-3 are not illustrated), MCS level control sections 412-1 to 412-3 (MCS level control sections 412-2 and 412-3 are not illustrated), and signal combining sections 413-1 to 413-3 (signal combining sections 413-2 and 413-3 are not illustrated).

Signals received at antennas 61 to 63 are inputted into a receiving section (Rx) 65 via a transmission/reception duplex section (DUP) 64. The receiving section 65 sends demodulation results for respective mobile stations 2 to the information separating sections 411-1 to 411-3. In the information separating sections 411-1 to 411-3, control information and user data included in the uplink signals are separated from each other. Communication path qualities included in the control information are inputted into the MCS level control sections 412-1 to 412-3 where a downlink modulation system and a coding system are determined. The communication path qualities are inputted into a scheduling control section 67 where scheduling is carried out to determine users to which data are transmitted.

The signal combining sections 413-1 to 413-3 of users to which data are transmitted, are inputted with control information from the scheduling control section 67 and uplink user data from a data transmission waiting queue 69. The signal combining sections 413-1 to 413-3 combines the control information and the user data together to produce transmission information. In a transmission section (Tx) 68, the transmission information is processed by using the modulation system and the coding system determined in the MCS level control sections 412-1 to 412-3, then transmitted to the mobile stations 2 via the transmission/reception duplex section 64 and the antennas 61 to 63.

The operations of the mobile station 2 and the base station 1 in this embodiment differ from those in the fifth embodiment of the present invention in that the mobile station 2 carries out the averaging and correction of the communication path qualities and notifies them to the base station 1.

In this embodiment, the mobile station 2 measures the interference power even in the standby state, performs the averaging process per state, corrects the communication path quality in the standby state by using the difference between the obtained mean values, and notifies it to the base station 1, and therefore, the communication path qualities are derived in the constant condition. Consequently, the same action is exhibited as that in the fifth embodiment of the present invention, and thus the same effect is achieved.

A seventh embodiment of the present invention differs from the mobile station 2 of the sixth embodiment of the present invention in that a mobile station 2 in this embodiment does not correct the communication path quality, but notifies instantaneous values and mean values. Further, the seventh embodiment of the present invention differs from the base station of the fifth embodiment of the present invention in that a base station 1 in this embodiment does not average the communication path qualities, but carries out correction by using the notified instantaneous values and mean values.

A mobile communication system according to the seventh embodiment of the present invention has the same system structure as that of the fifth embodiment of the present invention, and therefore, description thereof is omitted.

Figure 19:
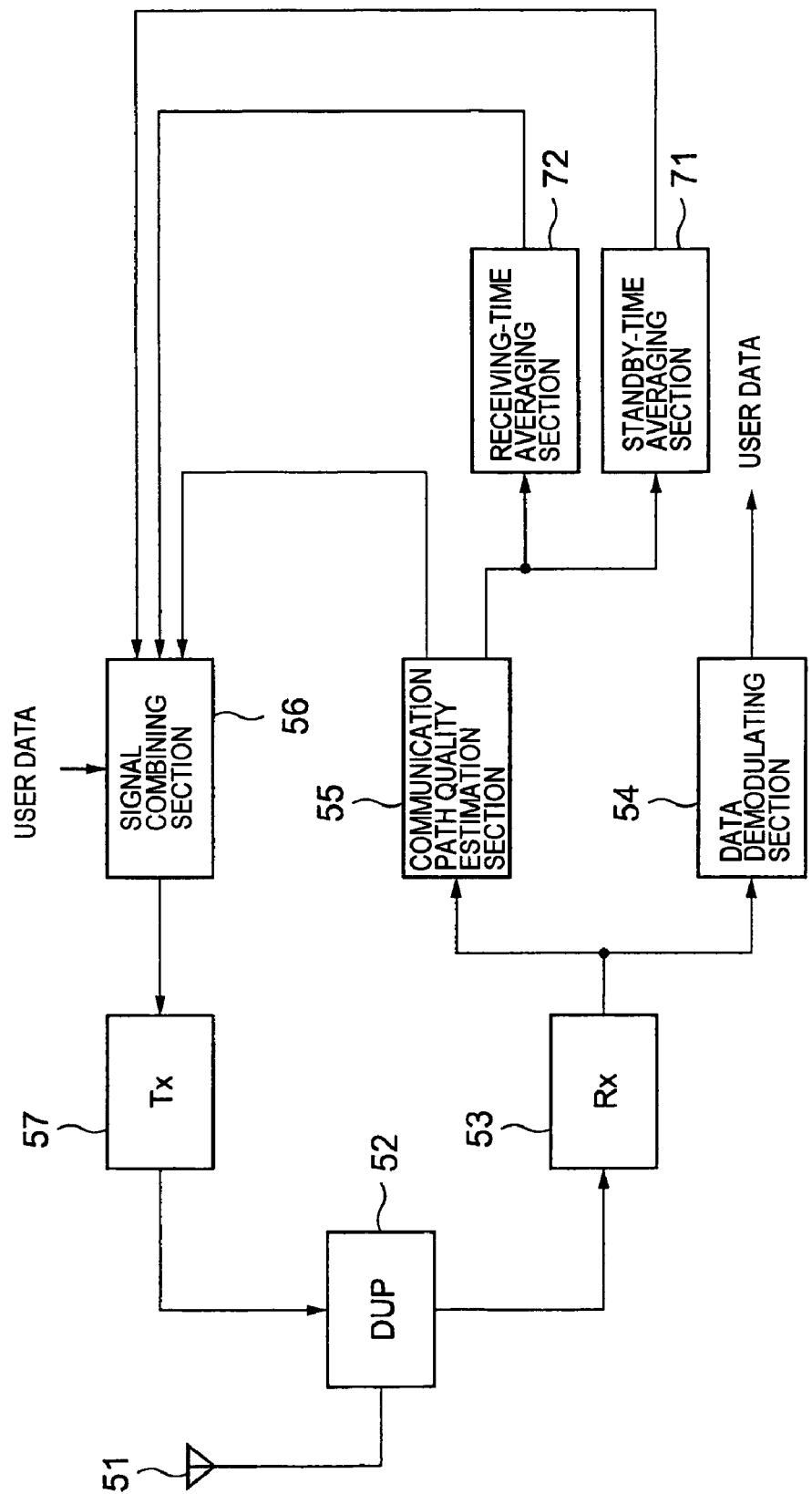
FIG. 19 is a block diagram showing a structure of a mobile station according to a seventh embodiment of the present invention.

FIG. 19 is a block diagram showing a structure of the mobile station 2 according to the seventh embodiment of the present invention. In FIG. 19, the mobile station 2 according to the seventh embodiment of the present invention has the same structure as that of the mobile station 2 according to the sixth embodiment of the present invention shown in FIG. 17 except that the communication path quality combining section 73 is omitted, and the same components are assigned the same symbols. Hereinbelow, description will be given about a difference between the mobile station 2 according to the seventh embodiment of the present invention and the mobile station 2 according to the sixth embodiment of the present invention.

In the sixth embodiment of the present invention, the outputs of the communication path quality estimating section 55, the standby-time averaging section 71, and the receiving-time averaging section 72 are respectively corrected by the communication path quality combining section 73. On the other hand, in the seventh embodiment of the present invention, instantaneous values of communication path qualities and the mean values thereof per state are all sent to a signal combining section 56.

Figure 20:
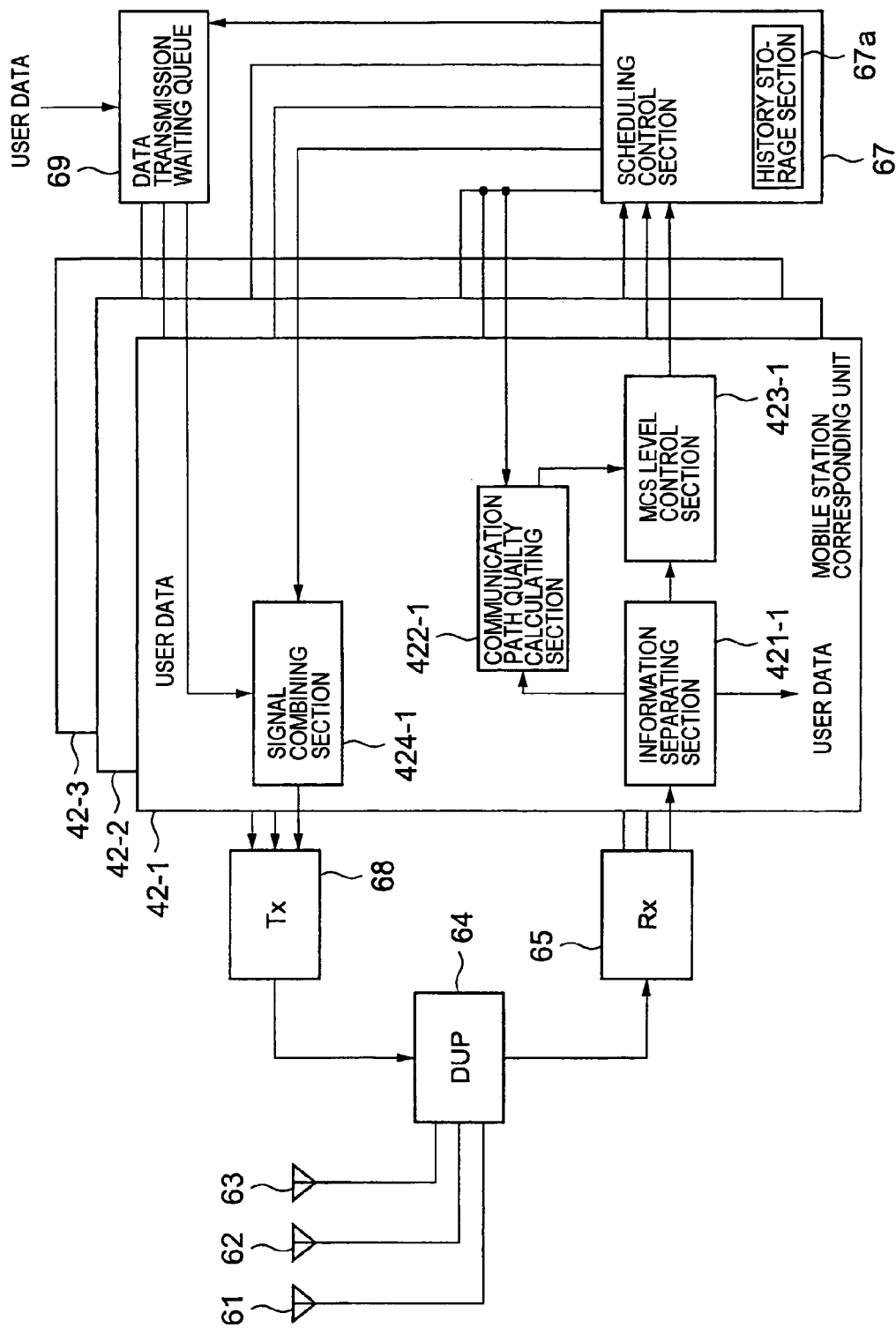
FIG. 20 is a block diagram showing a structure of a base station according to the seventh embodiment of the present invention.

FIG. 20 is a block diagram showing a structure of the base station 1 according to the seventh embodiment of the present invention. In FIG. 20, the base station 1 according to the seventh embodiment of the present invention has the same structure as that of the base station 1 according to the fifth embodiment o the present invention shown in FIG. 16 except that there is a difference in structure of mobile station corresponding units 42-1 to 42-3, and the same components are assigned the same symbols. In the mobile station corresponding units 42-1 to 42-3, communication path quality correcting sections 422-1 to 422-3 (communication path quality correcting sections 422-2 and 422-3 are not illustrated) are provided instead of the communication path quality calculating sections 162-1 to 162-3. Hereinbelow, description will be given about a difference between the seventh embodiment of the present invention and the fifth embodiment of the present invention.

In the fifth embodiment of the present invention, the communication path quality calculating sections 162-1 to 162-3 calculate the means values per state and correct instantaneous values by using a difference between the mean values in the standby state. On the other hand, in the seventh embodiment of the present invention, the communication path quality correcting sections 422-1 to 422-3 are used instead of the communication path quality calculating sections 162-1 to 162-3. The communication path quality correcting sections 422-1 to 422-3 correct the communication path qualities by using differences between instantaneous values and the mean values per state notified from the mobile stations 2.

The operation of the mobile station 2 according to the seventh embodiment of the present invention is the same as that of the mobile station 2 of the sixth embodiment of the present invention except only that there is a difference in data amount of communication path qualities notified, and therefore, description of the operation thereof is omitted.

The operation of the base station 1 according to the seventh embodiment of the present invention only differs in that differences are calculated based on the mean values notified to thereby carry out correction, while the other operation thereof is the same as that of the base station 1 of the sixth embodiment of the present invention, and therefore, description of the operation thereof is omitted.

In this embodiment, by using differences of the mean values of the communication path qualities per state derived by the mobile stations, the base station 1 carries out correction depending on the state to derive the communication path qualities in the constant condition. Therefore, the same action is exhibited as that in the fifth embodiment of the present invention, and thus the same effect is achieved.

The mobile station 2 according to the seventh embodiment of the present invention may notify differences between instantaneous values and the mean values instead of notifying instantaneous values and the mean values. In this case, the base station 1 corrects the communication path quality by using the notified differences relative to the instantaneous values. In this case, since the mobile station 2 notifies the differences between the instantaneous values and the mean values, there is a merit that the base station 1 can determine a value of coefficient r multiplied to the differences of the mean values.

An eighth embodiment of the present invention differs from the fifth embodiment of the present invention in that the correction method for the communication path quality is changed. A mobile communication system according to the eighth embodiment of the present invention has the same system structure as that of the fifth embodiment of the present invention shown in FIGS. 1 and 2, and therefore, description thereof is omitted.

A base station 1 according to the eighth embodiment of the present invention has the same structure as that of the base station 1 according to the fifth embodiment of the present invention shown in FIG. 16. However, since a processing method in communication path quality calculating sections 162-1 to 162-3 differs, description will be given about such a processing method hereinbelow.

The calculation method for the mean values depending on the state is the same as that in the fifth embodiment of the present invention. On the other hand, correction is carried out not using the differences, but is carried out based on the following equation (10) during waiting by weighting the mean values.

$$SIR = w_1 SIR_w(1) + w_2 SIR_w + w_3 SIR_r \quad (10)$$

For example, given that w1=w3=0.5 and w2=0, even when the waiting time continues, since the newest communication path qualities and the mean values during reception are averaged, it is possible to derive the communication path quality including the influence of multipath interference.

Further, during reception, correction is carried out based on the following equation (11) like during waiting.

$$SIR = w_1 SIR_r(1) + w_2 SIR_w + w_3 SIR_r \quad (11)$$

Given that w1=w3=0.5 and w2=0 like during waiting, since the newest communication path qualities and the mean values during reception are averaged, it is possible to derive the highly accurate communication path quality including the influence of multipath interference.

The foregoing communication path quality calculation method of the eighth embodiment of the present invention is applicable to the communication path quality correction method in the mobile station 2 according to the sixth embodiment of the present invention. Further, the communication path quality calculation method of the eighth embodiment of the present invention is also applicable to the communication path quality correction method in the base station 1 according to the seventh embodiment of the present invention.

In the eighth embodiment of the present invention, the mean communication path qualities per state are weighted-averaged so that the communication path quality taking into account the same multipath interference as that in the receiving state is derived even in the waiting state. That is, since notification of the communication path qualities is requested to all mobile stations 2 in the constant condition to thereby carry out the MCS level selection and the scheduling, there is achieved an effect of increasing the throughput.

In the respective embodiments of the present invention, the state where the mobile station 2 is receiving data addressed thereto is described as the data receiving state. However, even if the data receiving state includes the state where the foregoing adaptive antenna is not used and the mobile station 2 can receive data addressed to other mobile stations, the respective embodiments can be carried out in the same manner as described above.

Figure 21:
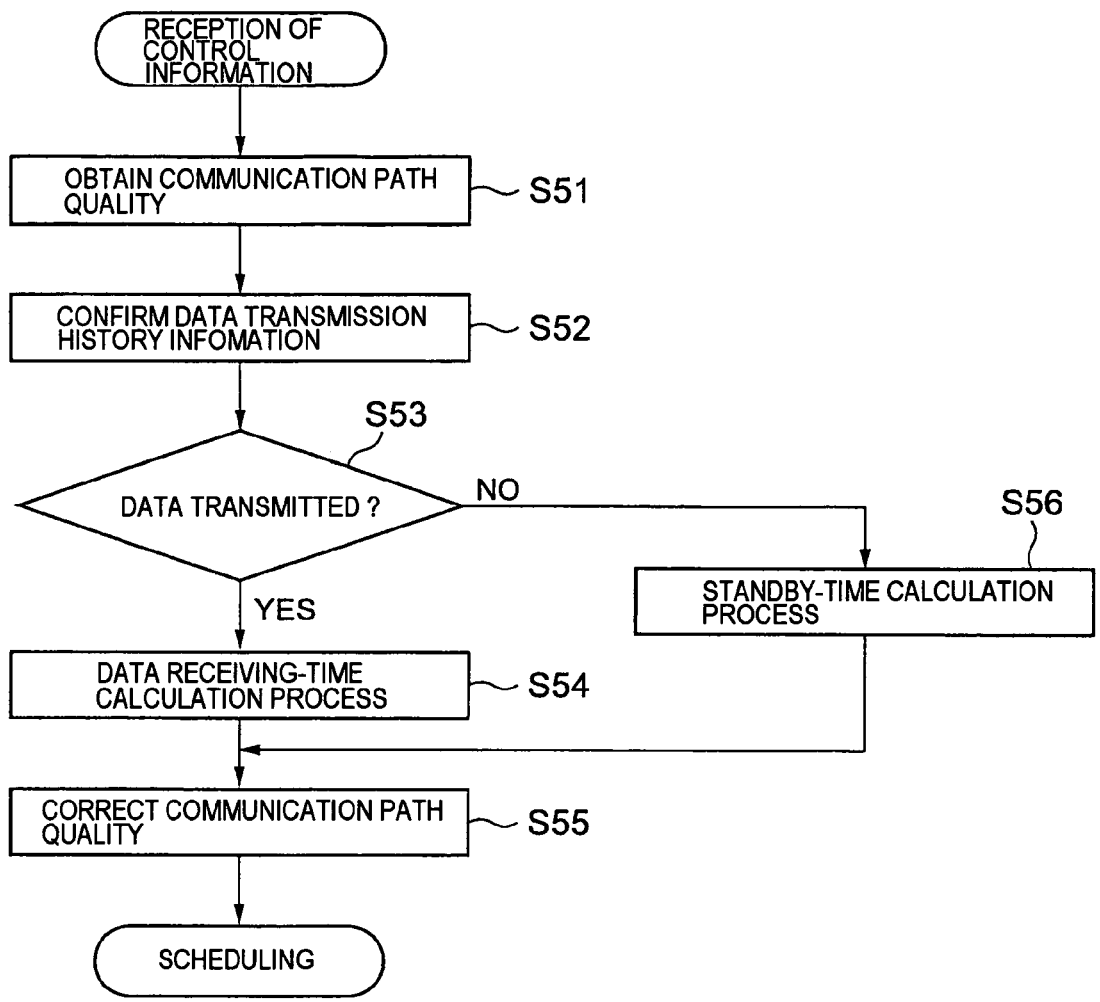
FIG. 21 is a flowchart showing correction processing for a communication path quality in a base station according to a ninth embodiment of the present invention.

FIG. 21 is a flowchart showing a communication path quality correction process of a base station according to a ninth embodiment of the present invention. Since the ninth embodiment of the present invention has the same structure as that of the fifth embodiment of the present invention and the seventh embodiment of the present invention, description of the structure thereof is omitted. The communication path quality correction process according to the ninth embodiment of the present invention is applicable not only to the case where the adaptive antenna is used like in the fifth embodiment of the present invention, the seventh embodiment of the present invention, and the eighth embodiment of the present invention, but also to the case where the adaptive antenna is not used and the mobile stations can receive data addressed to other mobile stations.

When control information is received from a mobile station, a base station obtains a communication path quality from the control information (step S51 in FIG. 21), and confirms data transmission history information based on history information of a scheduling control from a history storage section of a scheduling control section (step S52 in FIG. 21).

When data is transmitted (step S53 in FIG. 21), the base station performs a data receiving-time calculation process, i.e. obtains the newest communication path qualities and the mean values during reception (step S54 in FIG. 21). Then, depending on those values, the base station performs correction of the communication path quality by calculating the equation (8) in case of the first embodiment of the present invention and the seventh embodiment of the present invention and by calculating the equation (10) in case of the eighth embodiment of the present invention (step S55 in FIG. 21), and shifts to scheduling processing.

When data is not transmitted (step S53 in FIG. 21), the base station performs a standby-time calculation process, i.e. obtains the newest communication path qualities and the mean values during standby (step S56 in FIG. 21). Then, depending on those values, the base station performs correction of the communication path quality by calculating the equation (9) in case of the first embodiment of the present invention and the seventh embodiment of the present invention and by calculating the equation (11) in case of the eighth embodiment of the present invention (step S55 in FIG. 21), and shifts to scheduling processing. The operation other than the foregoing is the same as that of the fifth embodiment of the present invention, the seventh embodiment of the present invention, and the eighth embodiment of the present invention, and the effect thereof is also the same.

Figure 22:
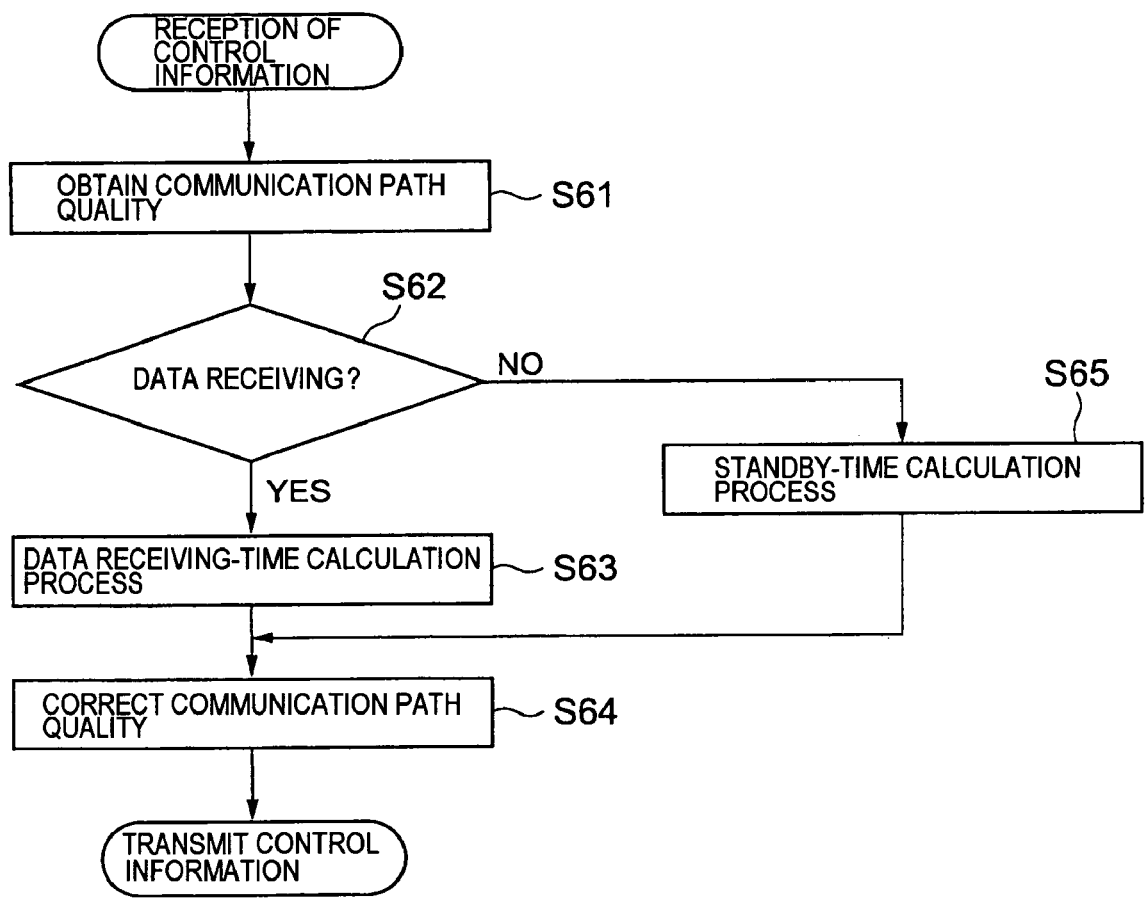
FIG. 22 is a flowchart showing correction processing for a communication path quality in a mobile station according to a tenth embodiment of the present invention.

FIG. 22 is a flowchart showing a communication path quality correction process of a mobile station according to a tenth embodiment of the present invention. Since the tenth embodiment of the present invention has the same structure as that of the sixth embodiment of the present invention, description of the structure thereof is omitted. The communication path quality correction process according to the tenth embodiment of the present invention is applicable not only to the case where the adaptive antenna is used like in the sixth embodiment of the present invention and the eighth embodiment of the present invention, but also to the case where the adaptive antenna is not used and the mobile stations can receive data addressed to other mobile stations.

When producing control information for a base station, a mobile station estimates a communication path quality (step S61 in FIG. 22), and judges whether or not data (in this case, data may be addressed to the subject mobile station or other mobile stations) is being received by using a receiving section thereof (step S62 in FIG. 22).

If data is being received, the mobile station performs a data receiving-time calculation process, i.e. obtains the newest communication path qualities and the mean values during reception (step S63 in FIG. 22). Then, depending on those values, the mobile station performs correction of the communication path quality by calculating the equation (9) in case of the sixth embodiment of the present invention and by calculating the equation (11) in case of the fourth embodiment of the present invention (step S64 in FIG. 22), and shifts to control information transmission processing.

When data is not being received, the mobile station performs a standby-time calculation process, i.e. obtains the newest communication path qualities and the mean values during standby (step S65 in FIG. 22). Then, depending on those values, the mobile station performs correction of the communication path quality by calculating the equation (8) in case of the fifth embodiment of the present invention and the seventh embodiment of the present invention and by calculating the equation (10) in case of the eighth embodiment of the present invention (step S64 in FIG. 22), and shifts to control information transmission processing. The operation other than the foregoing is the same as that of the sixth embodiment of the present invention and the eighth embodiment of the present invention, and the effect thereof is also the same.

As described above, the present invention according to the fifth to tenth embodiments is a mobile communication system comprising a plurality of mobile stations, and a base station for transmitting data to the plurality of mobile stations, respectively, wherein each of the mobile stations receives the data, measures a first communication path quality in a data receiving state and a second communication path quality in a data waiting state, and notifies information corresponding to a measurement result thereof to the base station, and the base station controls transmission of the data depending on a notification thereof. In this system, by using both the first communication path quality and the second communication path quality in a transmission control of the data, there is obtained an effect that the communication path quality can be estimated in a constant condition that does not rely on the communication state immediately before.

INDUSTRIAL APPLICABILITY

As described above, the mobile communication system according to the present invention is useful for the next generation mobile communication system (IMT-2000) wherein the high-speed large-capacity downlink packet system has been studied. Particularly, it is useful for mobile communications wherein a base station has means for carrying out a communication control based on communication path quality information that is transmitted by using control channels set between the base station and a plurality of mobile stations.

The invention claimed is:

1. A mobile communication system that uses an adaptive antenna in a base station and carries out downlink data transmission to a mobile station, said mobile communication system characterized in that said mobile station comprises:
   means for estimating a communication path quality by switching between a downlink common pilot channel transmitted with a first directivity and a downlink dedicated control channel transmitted with a second directivity; and
   means for notifying the estimation result thereof to said base station, and said base station comprises means for performing packet scheduling based on said communication path quality.

2. The mobile communication system according to claim 1, characterized in that said mobile station uses, for estimating said communication path quality, said downlink common pilot channel while waiting for data reception and said downlink dedicated control channel while receiving data.

3. The mobile communication system according to claim 2, characterized in that said mobile station uses said downlink common pilot channel for estimating said communication path quality after a predetermined time set in advance has elapsed from completion of said data reception.

4. The mobile communication system according to claim 1, characterized in that said mobile station uses a value estimated by the use of said downlink dedicated control channel in estimation of said communication path quality until a predetermined time set in advance has elapsed from a last transmission.

5. The mobile communication system according to claim 3, characterized in that said predetermined time is a time determined depending on a moving speed of said mobile station.

6. The mobile communication system according to claim 2, characterized in that said mobile station switches from said downlink dedicated control channel to said downlink common pilot channel when a reception quality of said downlink common pilot channel changes by a predetermined value or more from a last transmission.

7. The mobile communication system according to claim 2, characterized in that said mobile station uses a value estimated by the use of said dedicated control channel in estimation of said communication path quality when a change in reception quality of said downlink common control channel is a predetermined value or less from a last transmission.

8. The mobile communication system according to claim 1, characterized in that said base station carries out selection of a transmission mode as said communication control.

9. The mobile communication system according to claim 1, characterized in that said base station carries out scheduling as said communication control.

10. The mobile communication system according to claim 8, characterized in that the selection of said transmission mode is a selection of any of a modulation system, a coding system, and a spreading rate.

11. The mobile communication system according to claim 1, characterized in that said communication path quality is used for selecting a communication mode.

12. A mobile station to which downlink data transmission is carried out from a base station using an adaptive antenna, said mobile station characterized by comprising means for estimating a communication path quality by switching between a downlink common pilot channel transmitted with a first directivity and a downlink dedicated control channel transmitted with a second directivity.

13. The mobile station according to claim 12, characterized in that:
said downlink common pilot channel is used for estimating said communication path quality while waiting for data reception; and
said downlink dedicated control channel is used for estimating said communication path quality while receiving data.

14. The mobile station according to claim 13, characterized in that said downlink common pilot channel is used for estimating said communication path quality after a predetermined time set in advance has elapsed from completion of said data reception.

15. The mobile station according to claim 14, characterized in that a value estimated by said downlink dedicated control channel is used for estimating said communication path quality until the predetermined time set in advance has elapsed from a last transmission.

16. The mobile station according to claim 15, characterized in that said predetermined time is a time determined depending on a moving speed of the mobile station.

17. The mobile station according to claim 12, characterized by switching from said downlink dedicated control channel to said downlink common pilot channel when a reception quality of said downlink common pilot channel changes by a predetermined value or more from a last transmission.

18. The mobile station according to claim 12, characterized by using a value estimated by said downlink dedicated control channel for estimating said communication path quality when a change in reception quality of said downlink common control channel is a predetermined value or less from a last transmission.

19. A base station that carries out downlink data transmission to a mobile station by the use of an adaptive antenna, said base station characterized by comprising:
means for performing a communication control based on a result of estimation of a communication path quality from said mobile; and
said estimation carried out by switching between a downlink common pilot channel transmitted with a first directivity and a downlink dedicated control channel transmitted with a second directivity.

20. The base station according to claim 19, characterized by carrying out selection of a transmission mode as said communication control.

21. The base station according to claim 20, characterized in that the selection of said transmission mode is a selection of any of a modulation system, a coding system, and a spreading rate.

22. The base station according to claim 19, characterized by carrying out scheduling as said communication control.

23. A communication path quality estimation method of a mobile communication system that uses an adaptive antenna in a base station and carries out downlink data transmission to a mobile station, said communication path quality estimation method comprising:
estimating a communication path quality by switching between a downlink common pilot channel transmitted with a first directivity and a downlink dedicated control channel transmitted with a second directivity; and
the mobile station notifying the estimation result thereof to said base station.

24. The communication path quality estimation method according to claim 23, characterized in that said downlink common pilot channel is used for estimating said communication path quality while waiting for data reception and said downlink dedicated control channel is used for estimating said communication path quality while receiving data.

25. The communication path quality estimation method according to claim 24, characterized in that said downlink common pilot channel is used for estimating said communication path quality after a predetermined time set in advance has elapsed from completion of said data reception.

26. The communication path quality estimation method according to claim 23, characterized in that a value estimated by said downlink dedicated control channel is used for estimating said communication path quality until a predetermined time set in advance has elapsed from a last transmission.

27. The communication path quality estimation method according to claim 25, characterized in that said predetermined time is a time determined depending on a moving speed of the mobile station.

28. The communication path quality estimation method according to claim 23, characterized by switching from said downlink dedicated control channel to said downlink common pilot channel when a reception quality of said downlink common pilot channel changes by a predetermined value or more from a last transmission.

29. The communication path quality estimation method according to claim 23, characterized by using a value estimated by said downlink dedicated control channel for estimating said communication path quality when a change in reception quality of said downlink common control channel is a predetermined value or less from a last transmission.

30. The communication path quality estimation method according to claim 23, characterized in that said communication path quality is used for selecting a communication mode.

31. The communication path quality estimation method according to claim 23, characterized in that said communication path quality is used for scheduling.

32. A mobile communication system comprising:

a plurality of mobile stations; and a base station for transmitting data to said plurality of mobile stations, respectively;

wherein each of said mobile stations receives said data, measures a first communication path quality in a data receiving state and a second communication path quality in a data waiting state, and notifies information corresponding to the measurement result thereof to said base station; and said base station controls transmission of said data depending on a notification thereof;

said mobile communication system characterized by comprising means for performing a transmission control of said data by using both said first communication path quality and said second communication path quality.

33. The mobile communication system according to claim 32, characterized in that said mobile station notifies said base station of information corresponding to both said first communication path quality and said second communication path quality, and said base station controls the transmission of said data depending on the notification thereof.

34. The mobile communication system according to claim 33, characterized in that said mobile station notifies said base station of information obtained by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

35. The mobile communication system according to claim 33, characterized in that said mobile station notifies said base station of all of said first communication path quality measured in a first measurement zone being said data receiving state, said second communication path quality measured in a second measurement zone being said data waiting state, and a communication path quality measured in a third measurement zone being either one of said data receiving state and said data waiting state.

36. The mobile communication system according to claim 33, characterized in that said mobile station notifies said base station of a difference between said first communication path quality measured in a first measurement zone being said data receiving state and said second communication path quality measured in a second measurement zone being said data waiting state, and a communication path quality measured in a third measurement zone being either one of said data receiving state and said data waiting state.

37. The mobile communication system according to claim 32, characterized in that said base station uses both said first communication path quality and said second communication path quality for the transmission control of said data.

38. The mobile communication system according to claim 37, characterized in that said base station performs the transmission control of said data by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

39. The mobile communication system according to claim 11, characterized in that said mobile station obtains the communication path quality by using a reception signal quality of said data.

40. The mobile communication system according to claim 11, characterized in that said base station transmits a pilot signal, and said mobile station obtains the communication path quality by using said pilot signal.

41. The mobile communication system according to claim 11, characterized in that said base station transmits said data by using an adaptive antenna.

42. The mobile communication system according to claim 11, characterized in that said communication path quality is used for scheduling.

43. A mobile station included a mobile communication system comprising a plurality of mobile stations, and a base station for transmitting data to said plurality of mobile stations, respectively, wherein each of said mobile stations receives said data, measures a first communication path quality in a data receiving state and a second communication path quality in a data waiting state, and notifies information corresponding to a measurement result thereof to said base station, and said base station controls transmission of said data depending on the notification thereof said mobile station characterized by comprising:

means for notifying said base station of information corresponding to both said first communication path quality and said second communication path quality.

44. The mobile station according to claim 43, characterized by notifying said base station of information obtained by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

45. The mobile station according to claim 43, characterized by notifying said base station of all of said first communication path quality measured in a first measurement zone being said data receiving state, said second communication path quality measured in a second measurement zone being said data waiting state, and a communication path quality measured in a third measurement zone being either one of said data receiving state and said data waiting state.

46. The mobile station according to claim 43, characterized by notifying said base station of a difference between said first communication path quality measured in a first measurement zone being said data receiving state and said second communication path quality measured in a second measurement zone being said data waiting state, and a communication path quality measured in a third measurement zone being either one of said data receiving state and said data waiting state.

47. A base station included in a mobile communication system comprising:

a plurality of mobile stations; and a base station for transmitting data to said plurality of mobile stations, respectively;

wherein each of said mobile stations receives said data, measures a first communication path quality in a data receiving state and a second communication path quality in a data waiting state, and notifies information corresponding to the measurement result thereof to said base station; and said base station controls transmission of said data depending on the notification thereof;

said base station characterized by comprising means for performing a transmission control of said data by using both said first communication path quality and said second communication path quality.

48. The base station according to claim 47, characterized by performing the transmission control of said data by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

49. The base station according to claim 48, characterized in that an estimated value of said communication path quality is used for selecting a communication mode.

50. The base station according to claim 48, characterized in that an estimated value of said communication path quality is used for scheduling.

51. A communication path quality control method of a mobile communication system comprising a plurality of mobile stations, and a base station for transmitting data to said plurality of mobile stations, respectively, wherein each of said mobile stations receives said data, measures a first communication path quality in a data receiving state and a second communication path quality in a data waiting state, and notifies information corresponding to the measurement result thereof to said base station, and said base station controls transmission of said data depending on the notification thereof said communication path quality control method comprising:

using both said first communication path quality and said second communication path quality in the transmission control of said data.

52. The communication path quality control method according to claim 51, characterized in that said mobile station notifies said base station of information corresponding to both said first communication path quality and said second communication path quality, and said base station controls the transmission of said data depending on the notification thereof.

53. The communication path quality control method according to claim 52, characterized by notifying said base station from said mobile station of information obtained by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

54. The communication path quality control method according to claim 52, characterized by notifying said base station from said mobile station of all of said first communication path quality measured in a first measurement zone being said data receiving state, said second communication path quality measured in a second measurement zone being said data waiting state, and a communication path quality measured in a third measurement zone being either one of said data receiving state and said data waiting state.

55. The communication path quality control method according to claim 52, characterized by notifying said base station from said mobile station of a difference between said first communication path quality measured in a first measurement zone being said data receiving state and said second communication path quality measured in a second measurement zone being said data waiting state, and a communication path quality measured in a third measurement zone being either one of said data receiving state and said data waiting state.

56. The communication path quality control method according to claim 51, characterized in that said base station uses both said first communication path quality and said second communication path quality for the transmission control of said data.

57. The communication path quality control method according to claim 56, characterized in that said base station performs the transmission control of said data by using said first communication path quality measured in a first measurement zone being said data receiving state, said second communication path quality measured in a second measurement zone being said data waiting state, a communication path quality measured in a third measurement zone being either one of said data receiving state and said data waiting state, and information indicative of a state of said third measurement zone.

58. The communication path quality control method according to claim 51, characterized in that said mobile station obtains the communication path quality by using a reception signal quality of said data.

59. The communication path quality control method according to claim 51, characterized in that said base station transmits a pilot signal, and said mobile station obtains the communication path quality by using said pilot signal.

60. The communication path quality control method according to claim 51, characterized in that said base station transmits said data by using an adaptive antenna.

* * * * *